(12) United States Patent
Jones et al.

(10) Patent No.: US 8,324,334 B2
(45) Date of Patent: Dec. 4, 2012

(54) TELECHELIC OLEFIN METATHESIS POLYMERS FROM RENEWABLE FEEDSTOCKS

(75) Inventors: Simon C. Jones, Los Angeles, CA (US); Farshad J. Motamedi, Claremont, CA (US); Li-Sheng Wang, Azusa, CA (US); Brian Edgecombe, Anaheim, CA (US); Michael A. Giardello, Pasadena, CA (US)

(73) Assignee: Materia, Inc., Pasadena, CA (US)

( * ) Notice: Subject to any disclaimer, the term of this patent is extended or adjusted under 35 U.S.C. 154(b) by 0 days.

(21) Appl. No.: 13/060,058

(22) PCT Filed: Aug. 21, 2009

(86) PCT No.: PCT/US2009/004777
§ 371 (c)(1),
(2), (4) Date: Aug. 15, 2011

(87) PCT Pub. No.: WO2010/021740
PCT Pub. Date: Feb. 25, 2010

(65) Prior Publication Data
US 2011/0294971 A1    Dec. 1, 2011

Related U.S. Application Data

(60) Provisional application No. 61/189,943, filed on Aug. 21, 2008.

(51) Int. Cl.
*C08G 61/08*    (2006.01)
*C08F 4/80*    (2006.01)

(52) U.S. Cl. ........ 526/308; 526/171; 526/210; 526/281; 526/309

(58) Field of Classification Search .................. 526/171, 526/210, 281, 282, 283, 308, 309
See application file for complete search history.

(56) References Cited

U.S. PATENT DOCUMENTS

| | | | |
|---|---|---|---|
| 5,342,909 A * | 8/1994 | Grubbs et al. | 526/171 |
| 5,512,635 A * | 4/1996 | Nubel et al. | 525/247 |
| 6,476,167 B2 * | 11/2002 | Peters | 526/209 |
| 6,884,859 B2 | 4/2005 | Grubbs et al. | |
| 7,176,336 B2 | 2/2007 | Maughon et al. | |
| 2008/0064891 A1 | 3/2008 | Lee et al. | |

OTHER PUBLICATIONS

Hillmyer et al., "Utility of a Ruthenium Metathesis Catalyst for the Preparation of End-Functionalized Polybutadiene," Macromolecules 1997, 30, 718-721.*
Blackwell et al., New Approaches to Olefin Cross-Metathesis. J. Am. Chem. Soc. 2000, vol. 122, pp. 58-71. Jan. 12, 2000.

* cited by examiner

*Primary Examiner* — Fred M Teskin
(74) *Attorney, Agent, or Firm* — J.A. Lindeman & Co., PLLC

(57) ABSTRACT

Olefin metathesis polymerization reactions are disclosed, and more particularly ring-opening metathesis polymerization of cyclic olefins with olefinic compounds, such as are derived from seed oils and the like, to form telechelic polymers. In one aspect, a method is provided for carrying out a catalytic ring-opening metathesis polymerization reaction, comprising contacting at least one olefinic compound with at least one cyclic olefin, in the presence of a ruthenium alkylidene olefin metathesis catalyst under conditions effective to allow ring-opening metathesis polymerization of the cyclic olefin, whereby the cyclic olefin polymer formed is terminated with the olefinic compound. The invention has utility in the fields of catalysis, organic synthesis, polymer chemistry, and industrial chemistry.

17 Claims, 2 Drawing Sheets

TELECHELIC OLEFIN METATHESIS POLYMERS FROM RENEWABLE FEEDSTOCKS

PRIORITY STATEMENT

This application claims the benefit under 35 U.S.C. §119 (e) to U.S. Provisional Application Ser. No. 61/189,943, filed Aug. 21, 2008, and to PCT Application PCT/US09/04777, filed Aug. 21, 2009, herein incorporated by reference in their entirety.

TECHNICAL FIELD

This invention relates generally to olefin metathesis, and more particularly to the ring-opening metathesis of cyclic olefins with olefin compounds derived from renewable feedstocks, such as seed oils and the like, to form telechelic polymers. The invention has utility in the fields of catalysis, organic synthesis, polymer chemistry, and industrial chemistry.

BACKGROUND

The development of ruthenium olefin metathesis catalysts has firmly established olefin metathesis as a versatile and reliable synthetic technique for organic syntheses. The exceptionally wide scope of substrates and functional group tolerance makes olefin metathesis a valuable technique. In this application, the use of olefin metathesis to produce functionalized polymers is an example of the usefulness and the robustness of olefin metathesis technology. Compared to traditional synthetic organic techniques, olefin metathesis efficiently produces compounds and polymers that are otherwise hard to synthesize. Numerous hours of research have resulted in the elucidation of many olefin metathesis reactions catalyzed by various transition metal complexes. In particular, certain ruthenium and osmium carbene compounds, known as "Grubbs' catalysts," have been identified as effective catalysts for olefin metathesis reactions such as, for example, cross-metathesis (CM), ring-closing metathesis (RCM), ring-opening metathesis (ROM), ring opening cross metathesis (ROCM), ring-opening metathesis polymerization (ROMP) or acyclic diene metathesis (ADMET) polymerization.

Various methods of preparing telechelic polymers have been developed and disclosed in the art, in large part due to the continuing interest in preparing macromolecular materials through the reactive functional groups present at the chain termini of such polymers. For example, telechelic polymers have found use in a number of applications, including the synthesis of block and star polymers, and crosslinked and ionic polymer networks. Low molecular weight telechelic polymers have also been prepared for use in reaction molding systems, block copolymer formation, and in the development of thermoplastic elastomer and urethane systems.

Although many different types of functional end groups have potential utility, hydroxyl-functional telechelics have, by far, achieved the most commercial application. Hydroxyl-end functionalized telechelics synthesized via ROMP with chain transfer agents (CTAs) are disclosed in Chung et. al. (U.S. Pat. No. 5,247,023), Grubbs, et. al. (U.S. Pat. No. 5,750, 815) and Nubel, et al (U.S. Pat. Nos. 5,512,635, 5,559,190, 5,519,101 and 5,403,904). However, these hydroxyl-functional telechelics were synthesized via multi-step processes since protected diol CTAs (e.g., 1,4-diacetoxy-2-butene) were required to provide reasonable yields of polymers which then had to be deprotected to yield the desired hydroxy-functional materials. As an example, the attempted but unsuccessful use of 2-butene-1,4-diol as a CTA for forming telechelic polymers has also been reported in J. Am. Chem. Soc. 2003, 125, 8515-8522. Direct ROMP synthesis of hydroxy-telechelic polymers have been disclosed by Peters (U.S. Pat. No. 6,476,167) via the use of unsaturated polyether diol CTAs derived from the reaction product of unsaturated dihydric alcohols and alkylene oxides. Aside from the difficulties in purifying and characterizing such oligomeric CTAs, their polar nature may potentially lead to phase incompatibilities with many desired cycloalkene comonomers, and may diminish chemical resistance of the ultimate telechelics and/or downstream polymers synthesized therefrom.

Despite the advances achieved in preparing telechelic polymers via ROMP, a continuing need exists for the direct synthesis of hydroxyl-functionalized telechelic polymers from practical hydroxyl-functionalized CTAs. Of particular interest are systems that utilize materials derived from renewable feedstocks, in addition to allowing for the improved incorporation of functional groups in such telechelic polymers.

SUMMARY OF THE DISCLOSURE

Accordingly, the invention is directed to addressing one or more of the aforementioned concerns, and, in one embodiment, provides a method for preparing a telechelic polymer by carrying out a catalytic ring-opening metathesis reaction. The method comprises contacting at least one olefinic compound with at least one cyclic olefin, in the presence of a ruthenium alkylidene olefin metathesis catalyst to form a telechelic polymer. The at least one olefinic compound is selected from unsaturated diol compounds. The contacting is carried out under conditions effective to allow metathesis polymerization of the cyclic olefin and end termination of the polymer with the at least one olefinic compound.

In another aspect, the invention provides a method for preparing a telechelic polymer by carrying out a catalytic ring-opening metathesis reaction. The method comprises contacting at least one olefinic compound with at least one cyclic olefin functionalized with a functional group in the presence of a ruthenium alkylidene olefin metathesis catalyst. The at least one olefinic compound is selected from unsaturated diol compounds. The contacting is carried out under conditions effective to allow metathesis polymerization of the cyclic olefin and end termination of the polymer with the at least one olefinic compound.

In a further aspect, the invention provides a reaction system for carrying out a catalytic ring-opening metathesis polymerization reaction comprising at least one olefinic compound, at least one cyclic olefin, and a ruthenium alkylidene olefin metathesis catalyst. The at least one olefinic compound is selected from unsaturated diol compounds.

In a still further aspect, the invention provides a ring-opening metathesis polymerization product prepared using any of the methods and reaction systems disclosed herein.

DETAILED DESCRIPTION OF THE DISCLOSURE

Terminology and Definitions

Figure 1:
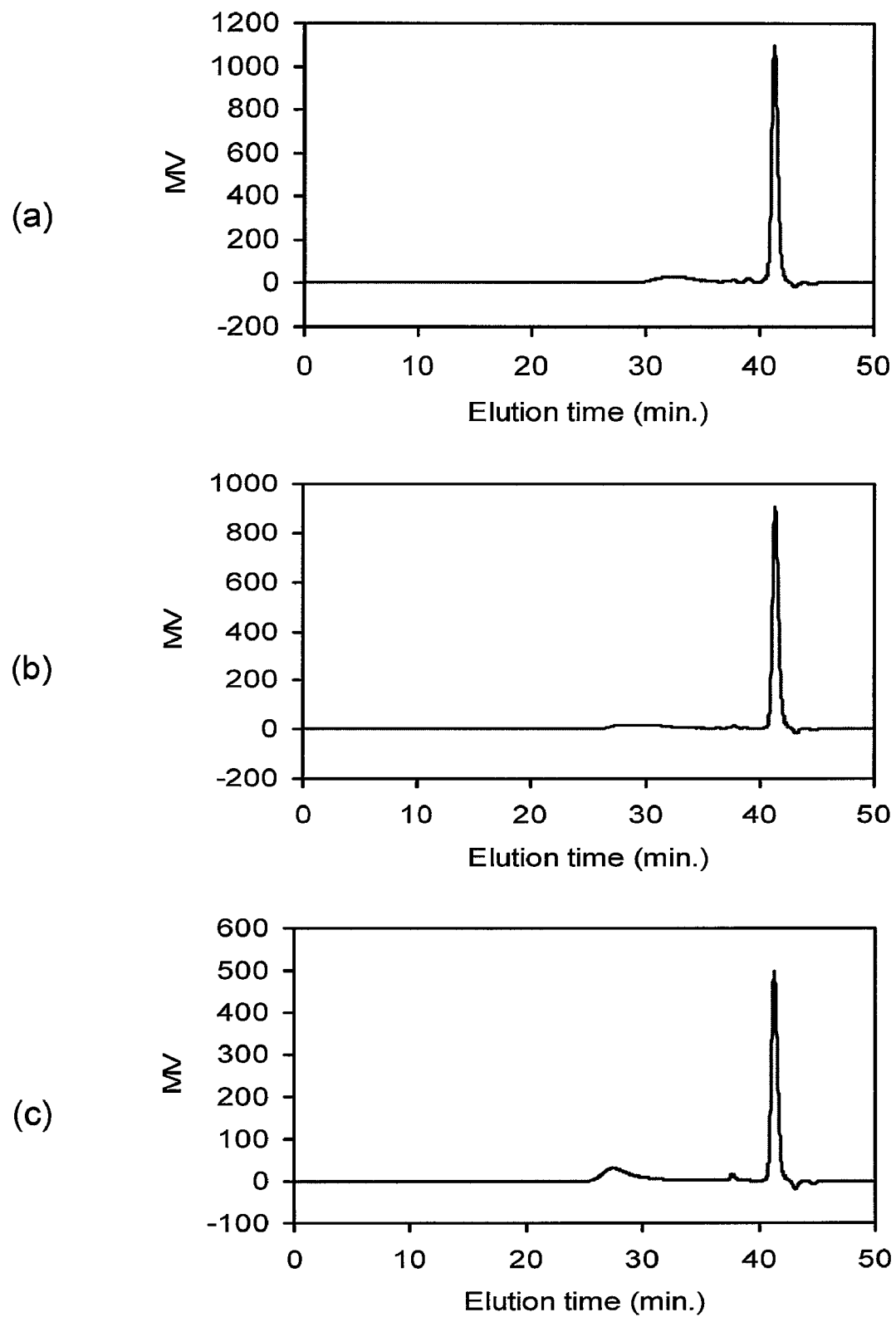
FIG. 1 depicts GPC elution chromatographs of (a) Examples 8A, (b) 8B, and (c) 8C with 2-C4 diol as chain transfer agent

Unless otherwise indicated, the invention is not limited to specific reactants, substituents, catalysts, reaction conditions, or the like, as such may vary. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" intends an alkenyl group of 2 to 6 carbon atoms, and the specific term "cycloalkenyl" intends a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or –O(CO)-aralkyl, wherein "alkyl," "aryl," and "aralkyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" intends a divalent hydrocarbyl moiety containing 1 to about 30 carbon atoms, preferably 1 to about 24 carbon atoms, most preferably 1 to about 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—O(CO)—O-aryl), carboxy (—COOH), carboxylato (—COO$^-$), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl, thiocarbamoyl (—(CS)—NH$_2$), mono-($C_1$-$C_{24}$ alkyl)-substituted thiocarbamoyl (—(CO)—NH($C_1$-$C_{24}$ alkyl)), di-($C_1$-$C_{24}$ alkyl)-substituted thiocarbamoyl (—(CO)—N($C_1$-$C_{24}$ alkyl)$_2$), mono-($C_5$-$C_{24}$ aryl)-substituted thiocarbamoyl (—(CO)—NH-aryl), di-($C_5$-$C_{24}$ aryl)-substituted thiocarbamoyl (—(CO)—N($C_5$-$C_{24}$ aryl)$_2$), di-N—($C_1$-$C_{24}$ alkyl), N—($C_5$-$C_{24}$ aryl)-substituted thiocarbamoyl, carbamido (—NH—(CO)—NH$_2$), cyano(—C≡N), cyanato (—O—C≡N), thiocyanato (—S—C≡N), formyl (—(CO)—H), thioformyl (—(CS)—H), amino (—NH$_2$), mono-($C_1$-$C_{24}$ alkyl)-substituted amino, di-($C_1$-$C_{24}$ alkyl)-substituted amino, mono-($C_5$-$C_{24}$ aryl)-substituted amino, di-($C_5$-$C_{24}$ aryl)-substituted amino, $C_2$-$C_{24}$ alkylamido (—NH—(CO)-alkyl), $C_6$-$C_{24}$ arylamido (—NH—(CO)-aryl), imino (—CR═NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR═N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR═N(aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_5$-$C_{24}$ arylsulfonyl (—SO$_2$-aryl), boryl (—BH$_2$), borono (—B(OH)$_2$), boronato (—B(OR)$_2$ where R is alkyl or other hydrocarbyl), phosphono (—P(O)(OH)$_2$), phosphonato (—P(O)(O)$_2$), phosphinato (—P(O)(O—), phospho (—PO$_2$), and phosphino (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove.

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

A "reaction system," as used herein, refers to a functionally related group of components.

Methods and Compositions

In a first aspect, the invention provides an olefin metathesis polymerization method in which the method involves ring-opening metathesis polymerization of at least one cyclic olefin in the presence of an olefinic compound to form a telechelic polymer. The olefinic compound is selected from unsaturated diol compounds or derivatives thereof. Generally, the olefinic compound may be derived from a variety of precursor compounds, including, e.g., unsaturated fatty acids, unsaturated fatty alcohols, esterification products of an unsaturated fatty acid with an alcohol, and esterification products of a saturated fatty acid with an unsaturated alcohol. It will be appreciated that esterification products of an unsaturated fatty acid with an alcohol include many commercially available and industrially significant compositions, e.g., monoglycerides, diglycerides, and triglycerides such as may be found in seed oils and the like, such that a variety of naturally-occurring renewable materials may be used to form the olefinic compound. The metathesis reaction is carried out catalytically, generally in the presence of a ruthenium alkylidene metathesis catalyst, typically by contacting the at least one olefinic compound with the at least one cyclic olefin, in the presence of the metathesis catalyst under reaction conditions effective to allow metathesis polymerization of the cyclic olefin and end termination of the polymer with the at least one olefinic compound.

The olefinic compound may generally be any olefinic compound that is suitable for the metathesis methods disclosed herein. Advantageously, the olefinic compound is selected from unsaturated diol compounds. The olefinic compound may also be a mixture of compounds.

The olefinic compound may generally be derived from a number of precursor compounds, including, e.g., (i) an unsaturated fatty acid, (ii) an unsaturated fatty alcohol, (iii) an esterification product of an unsaturated fatty acid with an alcohol, and (iv) an esterification product of a saturated fatty acid with an unsaturated alcohol. Such precursor compounds may be derived from a number of sources, including natural and renewable sources, such as seed and vegetable oils.

Fatty acids are organic compounds comprising a hydrophobic carbon chain substituted with an acid moiety at one end. The hydrophobic portion is a carbon chain that typically contains at least six carbon atoms, and may contain up to 20 or more carbon atoms in the chain. The hydrophobic carbon chain may be substituted or unsubstituted, may contain one or more heteroatoms such as N, O, S or P, may contain one or more functional groups such as those described hereinabove, and may contain one or more unsaturated regions (e.g., carbon-carbon double bonds or triple bonds). The substituents on the hydrophobic carbon chain may be any of the substituents described hereinabove. The hydrophobic carbon chain contains an acid moiety at one end, and the acid moiety is typically a carboxylic acid. The carboxylic acid moiety may be ionized, such that it is in the form of a salt (e.g., a sodium or potassium salt). The carboxylic acid may also be derivitized using any of the derivitization methods typically employed for carboxylic acid compounds. For example, the carboxylic acid may be esterified via an esterification reaction with an alcohol. Any alcohol suitable for esterification with the fatty acid may be employed. The alcohol may be saturated or unsaturated, and may be monohydric, dihydric, or polyhydric. The alcohol may be a $C_1$-$C_{20}$ alcohol that optionally contains one or more heteroatoms, and optionally contains one or more substituents. The alcohol may optionally be cyclic and/or branched. Examples of alcohols suitable for preparing esters from the fatty acids disclosed herein include methanol, ethanol, propanol (e.g., isopropanol), butanol, 1,2-dihydroxypropane, and glycerol.

Fatty alcohols are organic compounds comprising a hydrophobic carbon chain substituted with an alcohol moiety (i.e., —OH) at one end. The hydrophobic carbon chain is as described for fatty acids hereinabove. As with fatty acids, the alcohol moiety may be ionized, such that it is in the form of a salt (e.g., a sodium or potassium salt). Also as with fatty acids, the alcohol may be derivatized using any derivatization methods employed for alcohols. For example, the alcohol may be converted to an ether via reaction with a compound containing another alcohol, or may be converted to an ester via reaction with a compound containing a carboxylic acid. Any alcohol or ester suitable for derivatizing the fatty alcohol may be employed. Such alcohols and esters include $C_1$-$C_{20}$ alcohol and esters that optionally contain one or more heteroatoms, and optionally contain one or more substituents. The alcohols and esters may optionally be cyclic and/or branched. Examples of alcohols and esters suitable for derivatizing the fatty alcohols disclosed herein include methanol and acetic acid.

The fatty acids and fatty alcohols suitable for use as precursor compounds of the olefinic compound in the methods disclosed herein include unsaturated fatty acids or fatty acid derivatives and unsaturated fatty alcohols or fatty alcohol derivatives. That is, the precursor and olefinic compounds comprise at least one unsaturated moiety. In one aspect of the invention, the hydrophobic carbon chain of the fatty acid or fatty alcohol comprises at least one unsaturated moiety. In another aspect of the invention, the precursor compounds of the olefinic compound comprises a saturated fatty acid that is derivatized with an unsaturated compound, or the olefinic substrate comprises a saturated fatty alcohol that is derivitized with an unsaturated compound. For example, a saturated fatty acid may be esterified using an unsaturated alcohol.

Preferred unsaturated moieties of the precursor and/or olefinic compounds include internal olefins. By "internal olefin" is meant an olefin wherein each of the olefinic carbons is substituted by at least one non-hydrogen substituent. The non-hydrogen substituents are selected from hydrocarbyl, substituted hydrocarbyl, heteroatom-containing hydrocarbyl, substituted heteroatom-containing hydrocarbyl, and functional groups. The internal olefin is therefore at least disubstituted, and may further include additional non-hydrogen substituents (e.g., a trisubstituted internal olefin). Each of the substituents on the internal olefinic carbons may be further substituted as described supra. The internal olefin may be in the Z- or E-configuration. When the olefinic substrate comprises a plurality of internal olefins, the olefinic substrate may comprise a mixture of internal olefins (varying in stereochemistry and/or substituent identity), or may comprise a plurality of identical internal olefins.

In general, the olefinic compound may be represented by the formula $(R^I)(R^{II})C=C(R^{III})(R^{IV})$, wherein $R^I$, $R^{II}$, $R^{III}$, and $R^{IV}$ are independently selected from H, hydrocarbyl, substituted hydrocarbyl, heteroatom-containing hydrocarbyl, substituted heteroatom-containing hydrocarbyl, and functional groups, provided that at least one of $R^I$ or $R^{II}$ and at least one of $R^{III}$ or $R^{IV}$ is other than H. In a preferred embodiment, either $R^I$ or $R^{II}$ and either $R^{III}$ or $R^{IV}$ is H, such that the internal olefin is di-substituted.

In a preferred embodiment, the precursor compound of the olefinic compound is a derivative of glycerol, and has the structure of formula (I)

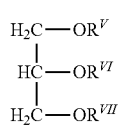

(I)

wherein $R^V$, $R^{VI}$, and $R^{VII}$ are independently selected from hydrogen, hydrocarbyl, substituted hydrocarbyl, heteroatom-containing hydrocarbyl, substituted heteroatom-containing hydrocarbyl, and functional groups, provided that at least one of $R^V$, $R^{VI}$, and $R^{VII}$ is other than hydrogen and comprises an internal olefin.

As an example, the precursor compound of the olefinic compound is a "glyceride," and comprises glycerol esterified with 1, 2, or 3 fatty acids, such that the olefinic substrate is a monoacylglycerol, diacylglycerol, or triacylglycerol (i.e., a monoglyceride, diglyceride, or triglyceride, respectively). The precursor compound may also be a mixture of glycerides. Each fatty acid-derived fragment of the precursor compound may independently be saturated, monounsaturated, or polyunsaturated, and may furthermore derive (or be derivable) from naturally-occurring fatty acids or from synthetic fatty acids. Thus, the glyceride may be a compound with the structure of formula (I), wherein $R^V$, $R^{VI}$, or $R^{VII}$, or a combination thereof, is $-C(=O)-R^{VIII}$, wherein $R^{VIII}$ is hydrocarbyl, substituted hydrocarbyl, heteroatom-containing hydrocarby, or substituted heteroatom-containing hydrocarbyl, provided that at least one of $R^V$, $R^{VI}$, and $R^{VII}$ contains an unsaturated moiety. As a further example, the precursor compound may comprise glycerol esterified with one, two, or three fatty acids that are independently selected from palmitoleic acid, vaccenic acid, erucic acid, oleic acid, alpha-linolenic acid, gamma-linolenic acid, linoleic acid, gadoleic acid, arachidonic acid, docosahexaenoic acid (i.e., DHA), eicosapentaenoic acid (i.e., EPA), and $CH_3(CH_2)_n COOH$, where n is 2, 3, 4, 5, 6, 7, 8, 9, 10, 11, 12, 13, 14, 15, 16, 17, 18, 19, 20, 21, or 22.

The precursor compound of the olefinic compound may be solid (e.g., a fat) or liquid (e.g., an oil). Preferred glycerides that may be used as the precursor compound are seed oils and/or other vegetable oils, or are compounds that derive from seed oils and/or vegetable oils. Preferred oil sources include soybean oil, sunflower oil, canola oil, safflower oil, cottonseed oil, castor oil, rapeseed oil, peanut oil, corn oil, olive oil, palm oil, sesame oil, palm kernel oil, meadowfoam oil, grape seed oil, phospholipids, phosphoglycerides, phosphatidyl ethanolamine, phosphatidyl choline, ceramides, and sphingolipids. Further preferred oils include seed oil esters, such as jojoba oil, jatropha oil, and oils from animal sources such as fish oil, butterfat, lard, tallow, chicken fat, goose fat, menhaden oil, cod liver oil, herring oil, seal oil, shark oil, and whale oil.

The olefinic compound may be a compound or mixture of compounds that is derived from the precursor compound using any one or combination of methods well known in the chemical arts. Such methods include saponification, esterification, hydrogenation, isomerization, oxidation, and reduction. For example, the precursor compound may be the carboxylic acid or mixture of carboxylic acids that result from the saponification of a monoacylglycerol, diacylglycerol, triacylglycerol, or mixture thereof. In a preferred embodiment, the precursor compound is a fatty acid methyl ester (FAME), i.e., the methyl ester of a carboxylic acid that is derived from a glyceride. Sunflower FAME, safflower FAME, soy FAME (i.e., methyl soyate), and canola FAME are examples of such precursor compounds of the olefinic compound. Additionally, precursor compounds may include derivatives of fatty acids such as oleamides, linoleamides, linolenamides, erucamide and substitution of the nitrogen with any combination of hydrogen, alkyl and aryl groups.

In a preferred aspect of the invention, the olefinic compound is an unsaturated diol, or mixture thereof, containing terminal hydroxyl groups, in which the olefinic compound is derived from a renewable material, such as a seed oil. Preferably, the olefinic compound is a terminal diol having a carbon number of greater than $C_4$. Generally, the unsaturated diol has the structure of formula (A)

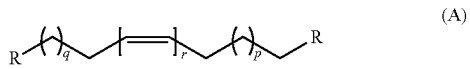

(A)

wherein,
R is an —OH group;
r is 1, 2, or 3; and
p and q are independently from 0 to 30, provided at least one of p and q is not zero.

While not limited thereto, p and q are each preferably and independently in the range of from about 4 to about 16, and more particularly from about 6 to about 12. In addition, as noted, the olefinic compound advantageously has a carbon number of greater than 4 carbons, preferably 5 or more, or 6 or more, or 8 or more, or 9 or more, or 10 or more carbons. The olefinic compound may be a diol having from 5-32 carbons, preferably from 5-24 carbons, more preferably from 6-24 carbons, or 6-18 carbons. The olefinic compound may have non-terminal or terminal hydroxyl groups.

Advantageously, precursor compounds of the olefinic compound include seed oil-derived compounds such as dec-9-enoic acid methyl ester (9DA) and dodec-9-enoic acid methyl ester (9DDA) derived from a seed oil FAME such as soy FAME. Other precursor compounds include jojoba alcohols derived from jojoba oil (including a mixture of octadec-9-en-1-ol, eicos-11-en-1-ol and docos-13-en-1-ol).

Preferred fatty alcohol derivatives include oleyl chloride (ie 9-octadecenyl chloride), oleyl bromide, oleyl iodide, oleyl fluoride, linoleyl chloride (ie 9,12-octadecadienyl chloride), linoleyl bromide, linoleyl iodide, linoleyl fluoride, linolenyl chloride (ie 9,12,15-octadecatrienyl chloride), linolenyl bromide, linolenyl iodide, linolenyl fluoride, oleyl amine, linoleyl amine, linolenyl amine, oleyl thiol, linoleyl thiol, linolenyl thiol, oleyl phosphine, linoleyl phosphine, linolenyl phosphine.

In addition to the olefinic compound, described hereinabove, the metathesis reactions disclosed herein involve a cyclic olefin. In general, any cyclic olefin suitable for the metathesis reactions disclosed herein may be used. Preferred cyclic olefins include optionally substituted, optionally heteroatom-containing, mono-unsaturated, di-unsaturated, or poly-unsaturated $C_5$ to $C_{24}$ hydrocarbons that may be mono-, di- or poly-cyclic. The cyclic olefin may be stained or unstrained.

Preferred cyclic olefins include $C_5$ to $C_{24}$ unsaturated hydrocarbons. Also preferred are $C_5$ to $C_{24}$ cyclic hydrocarbons that contain one or more (typically 2 to 12) heteroatoms such as O, N, S, or P. For example, crown ether cyclic olefins may include numerous O heteroatoms throughout the cycle, and these are within the scope of the invention. In addition, preferred cyclic olefins are $C_5$ to $C_{24}$ hydrocarbons that contain one or more (typically 2 or 3) olefins. For example, the cyclic olefin may be mono-, di-, or tri-unsaturated. Examples of cyclic olefins include cyclooctene, cyclododecene, and (c,t,t)-1,5,9-cyclododecatriene.

The cyclic olefins may also comprise multiple (typically 2 or 3) rings. For example, the cyclic olefin may be mono-, di-, or tri-cyclic. When the cyclic olefin comprises more than one ring, the rings may or may not be fused. Examples of cyclic olefins that comprise multiple rings include norbornene, dicyclopentadiene, and 5-ethylidene-2-norbornene.

The cyclic olefin may also be substituted—for example, a $C_5$ to $C_{24}$ cyclic hydrocarbon wherein one or more (typically 2, 3, 4, or 5) of the hydrogens are replaced with non-hydrogen substituents. Suitable non-hydrogen substituents may be chosen from the substituents described hereinabove. For example, functionalized cyclic olefins, i.e., $C_5$ to $C_{24}$ cyclic hydrocarbons wherein one or more (typically 2, 3, 4, or 5) of the hydrogens are replaced with functional groups, are within the scope of the invention. Suitable functional groups may be chosen from the functional groups described hereinabove. For example, a cyclic olefin functionalized with an alcohol group may be used to prepare a telechelic polymer comprising pendent alcohol groups. Functional groups on the cyclic olefin may be protected in cases where the functional group interferes with the metathesis catalyst, and any of the protecting groups commonly used in the art may be employed. Acceptable protecting groups may be found, for example, in Greene et al., *Protective Groups in Organic Synthesis*, $3^{rd}$ Ed. (New York: Wiley, 1999). Examples of functionalized cyclic olefins include 2-hydroxymethyl-5-norbornene, 2-[(2-hydroxyethyl)carboxylate]-5-norbornene, Cydecanol, 5-n-hexyl-2-norbornene, 5-n-butyl-2-norbornene.

Cyclic olefins incorporating any combination of the above-mentioned features (i.e., heteroatoms, substituents, multiple olefins, multiple rings) are suitable for the methods disclosed herein.

The cyclic olefins useful in the methods disclosed herein may be strained or unstrained. It will be appreciated that the amount of ring strain varies for each compound, and depends upon a number of factors including the size of the ring, the presence and identity of substituents, and the presence of multiple rings. Ring strain is one factor in determining the reactivity of a molecule towards ring-opening olefin metathesis reactions. Highly strained cyclic olefins, such as certain bicyclic compounds, readily undergo ring opening reactions with olefin metathesis catalysts. Less strained cyclic olefins, such as certain unsubstituted hydrocarbon monocyclic olefins, are generally less reactive to such reactions. It should be noted, however, that in some cases, ring opening reactions of relatively unstrained (and therefore relatively unreactive) cyclic olefins may become possible when performed in the presence of the olefinic compounds disclosed herein.

A plurality of cyclic olefins may be used to form the metathesis polymer prepared in the presence of the olefinic compound. For example, two cyclic olefins selected from the cyclic olefins described hereinabove may be employed in order to form metathesis products that incorporate both cyclic olefins. Where two or more cyclic olefins are used, one example of a second cyclic olefin is a cyclic alkenol, i.e., a $C_5$-$C_{24}$ cyclic hydrocarbon wherein at least one of the hydrogen substituents is replaced with an alcohol or protected alcohol moiety to yield a functionalized cyclic olefin.

The use of a plurality of cyclic olefins, and in particular when at least one of the cyclic olefins is functionalized, allows for further control over the positioning of functional groups within the products. For example, the density of cross-linking points can be controlled in polymers and macromonomers prepared using the methods disclosed herein. Control over the quantity and density of substituents and functional groups also allows for control over the physical properties (e.g., melting point, tensile strength, glass transition temperature, etc.) of the products. Control over these and other properties is possible for reactions using only a single cyclic olefin, but it will be appreciated that the use of a plurality of cyclic olefins further enhances the range of possible metathesis products and telechelic polymers formed.

A ring-opening methathesis polymerization reaction is carried out by metathesis polymerizing the at least one cyclic olefin, in the presence of the olefinic compound and the metathesis catalyst under reaction conditions effective to allow metathesis polymerization of the cyclic olefin and end termination of the polymer formed thereby with the olefinic compound. Scheme A illustrates the formation of a telechelic polymer derived from a cyclic olefin.

Methathesis polymerization using a single cyclic olefin in the presence of an olefinic compound to form a telecheclic polymer

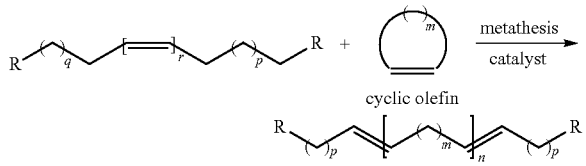

r=1, 2 or 3 m and n are any number p and q are independently taken from 0 to 30, provided at least one of p and q is not zero R=terminal functional group, e.g., —OH In scheme A, it will be appreciated that the use of more than one cyclic olefin and more than one olefinic compound is possible, resulting in a product telechelic polymer composition. In addition, the use of functionalized cyclic olefins provides telechelic polymers with interior chain functionality.

The reactions disclosed herein are catalyzed by any of the metathesis catalysts that are described infra. The catalyst is typically added to the reaction medium as a solid, but may also be added as a solution wherein the catalyst is dissolved in an appropriate solvent, or as a suspension wherein the catalyst is suspended in an appropriate liquid. It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of the olefinic substrate. Catalyst loading, when measured in ppm relative to the amount of the olefinic substrate, is calculated using the equation $$\text{ppm catalyst} = \frac{\text{moles catalyst}}{\text{moles olefinic substrate}} * 1{,}000{,}000$$

Alternatively, the amount of catalyst can be measured in terms of mol % relative to the amount of olefinic substrate, using the equation $$\text{mol \% catalyst} = \frac{\text{moles catalyst}}{\text{moles olefinic substrate}} * 100$$

Thus, the catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

In a preferred embodiment, the reactions disclosed herein are carried out under a dry, inert atmosphere. Such an atmosphere may be created using any inert gas, including such gases as nitrogen and argon. The use of an inert atmosphere is optimal in terms of promoting catalyst activity, and reactions performed under an inert atmosphere typically are performed with relatively low catalyst loading. The reactions disclosed herein may also be carried out in an oxygen-containing and/or a water-containing atmosphere, and in one embodiment, the reactions are carried out under ambient conditions. The presence of oxygen or water in the reaction may, however, necessitate the use of higher catalyst loadings as compared with reactions performed under an inert atmosphere. Where the vapor pressure of the reactants allows, the reactions disclosed herein may also be carried out under reduced pressure.

The olefin metathesis catalyst for carrying out the reactions disclosed herein is preferably a Group 8 transition metal complex having the structure of formula (II)

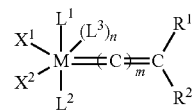
(II)

in which the various substituents are as follows:

M is a Group 8 transition metal;

$L^1$, $L^2$ and $L^3$ are neutral electron donor ligands;

n is 0 or 1, such that $L^3$ may or may not be present;

m is 0, 1, or 2;

$X^1$ and $X^2$ are anionic ligands; and $R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Preferred catalysts contain Ru or Os as the Group 8 transition metal, with Ru particularly preferred.

Numerous embodiments of the catalysts useful in the reactions disclosed herein are described in more detail infra. For the sake of convenience, the catalysts are described in groups, but it should be emphasized that these groups are not meant to be limiting in any way. That is, any of the catalysts useful in the invention may fit the description of more than one of the groups described herein.

A first group of catalysts, then, are commonly referred to as First Generation Grubbs-type catalysts, and have the structure of formula (II). For the first group of catalysts, M and m are as described above, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines.

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

$R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or —C=C(CH$_3$)$_2$.

Any two or more (typically two, three, or four) of $X^1$, $X^2$, $L^1$, $L^2$, $L^3$, $R^1$, and $R^2$ can be taken together to form a cyclic group, including bidentate or multidentate ligands, as disclosed, for example, in U.S. Pat. No. 5,312,940 to Grubbs et al. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as Second Generation Grubbs-type catalysts, have the structure of formula (II), wherein $L^1$ is a carbene ligand having the structure of formula (III)

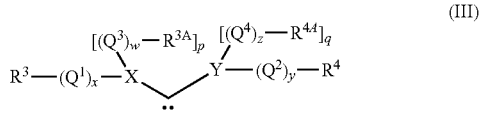
(III)

such that the complex may have the structure of formula (IV)

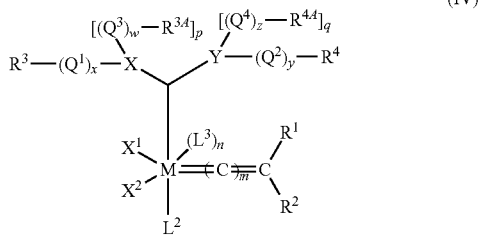
(IV)

wherein M, m, n, $X^1$, $X^2$, $L^2$, $L^3$, $R^1$, and $R^2$ are as defined for the first group of catalysts, and the remaining substituents are as follows.

X and Y are heteroatoms typically selected from N, O, S, and P. Since O and S are divalent, p is necessarily zero when X is O or S, and q is necessarily zero when Y is O or S. However, when X is N or P, then p is 1, and when Y is N or P, then q is 1. In a preferred embodiment, both X and Y are N.

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group.

$R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl.

In addition, any two or more of $X^1$, $X^2$, $L^1$, $L^2$, $L^3$, $R^1$, $R^2$, $R^3$, $R^{3A}$, $R^4$, and $R^{4A}$ can be taken together to form a cyclic group, and any one or more of $X^1$, $X^2$, $L^1$, $L^2$, $L^3$, $R^1$, $R^2$, $R^3$, $R^{3A}$, $R^4$, and $R^{4A}$ may be attached to a support.

Preferably, $R^{3A}$ and $R^{4A}$ are linked to form a cyclic group so that the carbene ligand has the structure of formula (V)

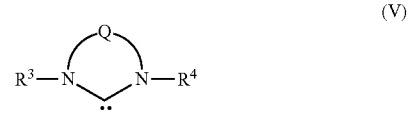
(V)

wherein $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although again not necessarily, a two-atom linkage or a three-atom linkage.

Examples of N-heterocyclic carbene ligands suitable as $L^1$ thus include, but are not limited to, the following:

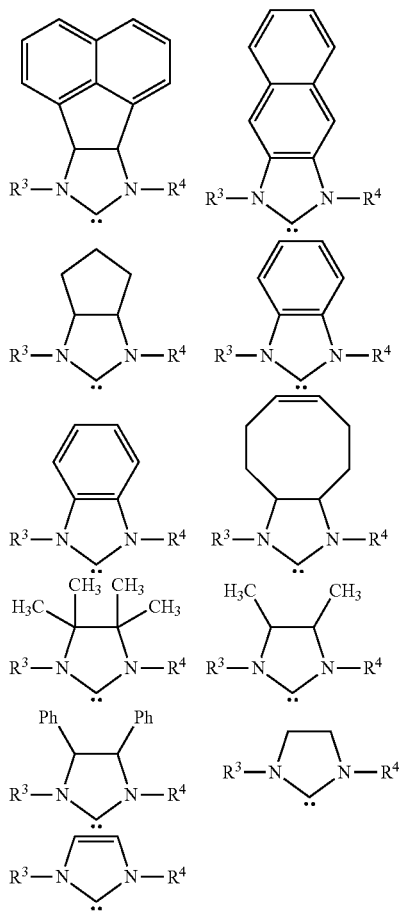

When M is ruthenium, then, the preferred complexes have the structure of formula (VI)

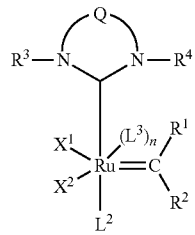

(VI)

In a more preferred embodiment, Q is a two-atom linkage having the structure —CR$^{11}$R$^{12}$—CR$^{13}$R$^{14}$— or —CR$^{11}$=CR$^{13}$—, preferably —CR$^{11}$R$^{12}$—CR$^{13}$R$^{14}$—, wherein R$^{11}$, R$^{12}$, R$^{13}$, and R$^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. R$^{11}$, R$^{12}$, R$^{13}$, and R$^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of R$^{11}$, R$^{12}$, R$^{13}$, and R$^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents.

When R$^3$ and R$^4$ are aromatic, they are typically although not necessarily composed of one or two aromatic rings, which may or may not be substituted, e.g., R$^3$ and R$^4$ may be phenyl, substituted phenyl, biphenyl, substituted biphenyl, or the like. In one preferred embodiment, R$^3$ and R$^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, R$^3$ and R$^4$ are mesityl.

In a third group of catalysts having the structure of formula (II), M, m, n, X$^1$, X$^2$, R$^1$, and R$^2$ are as defined for the first group of catalysts, L$^1$ is a strongly coordinating neutral electron donor ligand such as any of those described for the first and second group of catalysts, and L$^2$ and L$^3$ are weakly coordinating neutral electron donor ligands in the form of optionally substituted heterocyclic groups. Again, n is zero or 1, such that L$^3$ may or may not be present. Generally, in the third group of catalysts, L$^2$ and L$^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of L$^2$ and L$^3$ include, without limitation, heterocycles containing nitrogen, sulfur, oxygen, or a mixture thereof.

Examples of nitrogen-containing heterocycles appropriate for L$^2$ and L$^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole.

Examples of sulfur-containing heterocycles appropriate for L$^2$ and L$^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for L$^2$ and L$^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for L$^2$ and L$^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred L$^2$ and L$^3$ ligands are aromatic nitrogen-containing and oxygen-containing heterocycles, and particularly preferred L$^2$ and L$^3$ ligands are monocyclic N-heteroaryl ligands that are optionally substituted with 1 to 3, preferably 1 or 2, substituents. Specific examples of particularly preferred L$^2$ and L$^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on L$^2$ and/or L$^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di$C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

$L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VII)

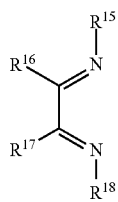

(VII)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$—, —As(Ph)$_2$CH$_2$CH$_2$As(Ph$_2$)—, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$ CH$_2$CH$_2$P(Ph)$_2$— and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, and $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to O$_2$C(CH$_2$)$_2$P(Ph)(CH$_2$)$_2$P(Ph)CH$_2$)$_2$ CO$_2$, phthalocyanines, and porphyrins.

Complexes wherein $L^2$ and $R^2$ are linked are examples of the fourth group of catalysts, and are commonly called "Grubbs-Hoveyda" catalysts. Examples of Grubbs-Hoveyda-type catalysts include the following:

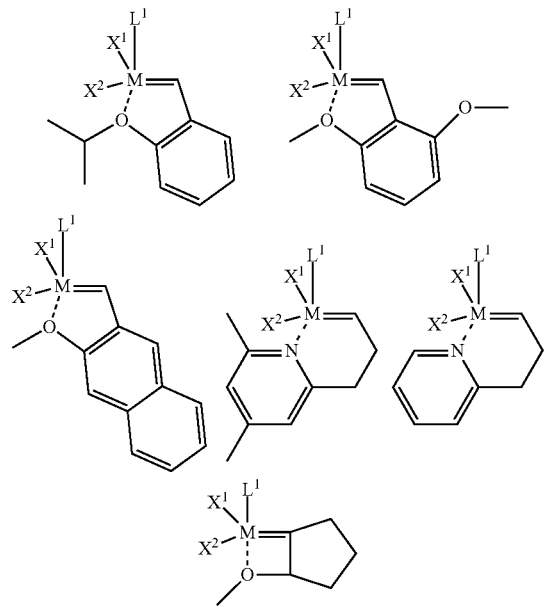

wherein $L^1$, $X^1$, $X^2$, and M are as described for any of the other groups of catalysts.

In addition to the catalysts that have the structure of formula (II), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (VIII);

neutral ruthenium or osmium metal carbene complexes containing metal centers that are formally in the +2 oxidation state, have an electron count of 18, are hexa-coordinated, and are of the general formula (IX);

cationic ruthenium or osmium metal carbene complexes containing metal centers that are formally in the +2 oxidation state, have an electron count of 14, are tetra-coordinated, and are of the general formula (X); and cationic ruthenium or osmium metal carbene complexes containing metal centers that are formally in the +2 oxidation state, have an electron count of 14, are penta-coordinated, and are of the general formula (XI)

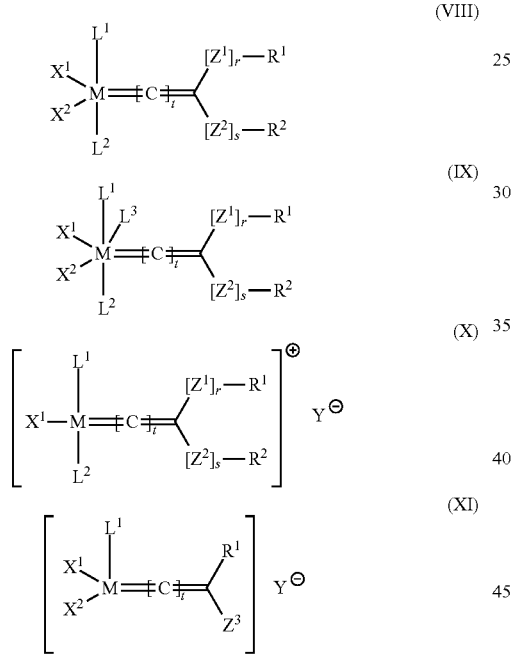

wherein: $X^1$, $X^2$, $L^1$, $L^2$, n, $L^3$, $R^1$, and $R^2$ are as defined for any of the previously defined four groups of catalysts; r and s are independently zero or 1; t is an integer in the range of zero to 5; Y is any non-coordinating anion (e.g., a halide ion, $BF_4^-$, etc.); $Z^1$ and $Z^2$ are independently selected from —O—, —S—, —NR$^2$—, —PR$^2$—, —P(=O)R$^2$—, —P(OR$^2$)—, —P(=O)(OR$^2$)—, —C(=O)—, —C(=O)O—, —OC(=O)—, —OC(=O)O—, —S(=O)—, and —S(=O)$_2$—; $Z^3$ is any cationic moiety such as —P($R^2$)$_3^+$ or —N($R^2$)$_3^+$; and any two or more of $X^1$, $X^2$, $L^1$, $L^2$, $L^3$, n, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, $_n$, $L^3$, $Z^1$, $Z^2$, $Z^3$, $R^1$, and $R^2$ may be attached to a support.

As is understood in the field of catalysis, suitable solid supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect, if indirect, typically through a functional group on a support surface.

Non-limiting examples of catalysts that may be used in the reactions disclosed herein include the following, some of which for convenience are identified throughout this disclosure by reference to their molecular weight:

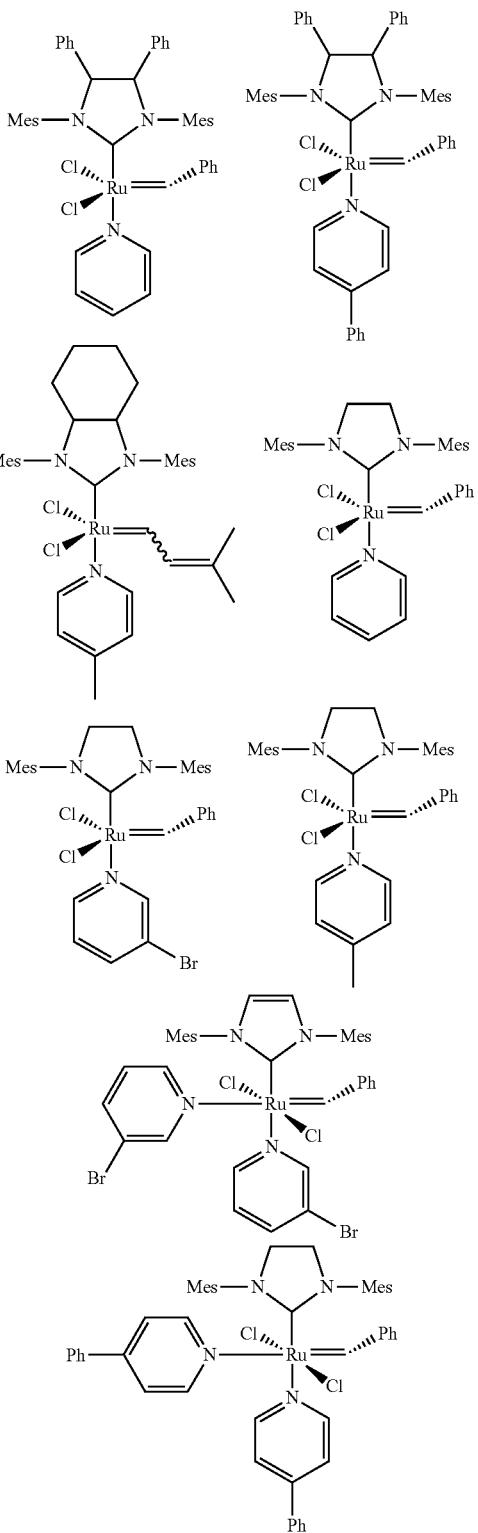

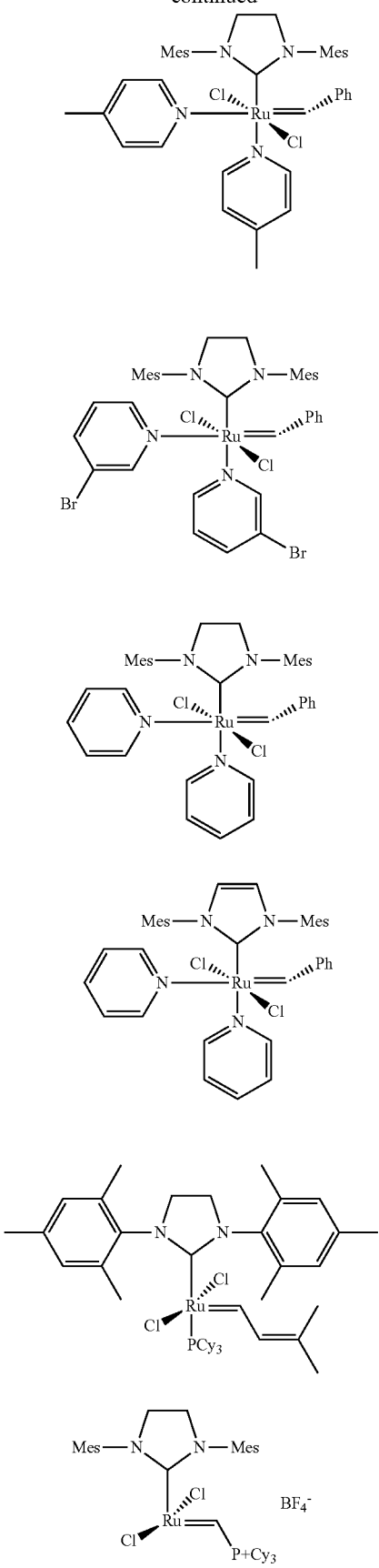
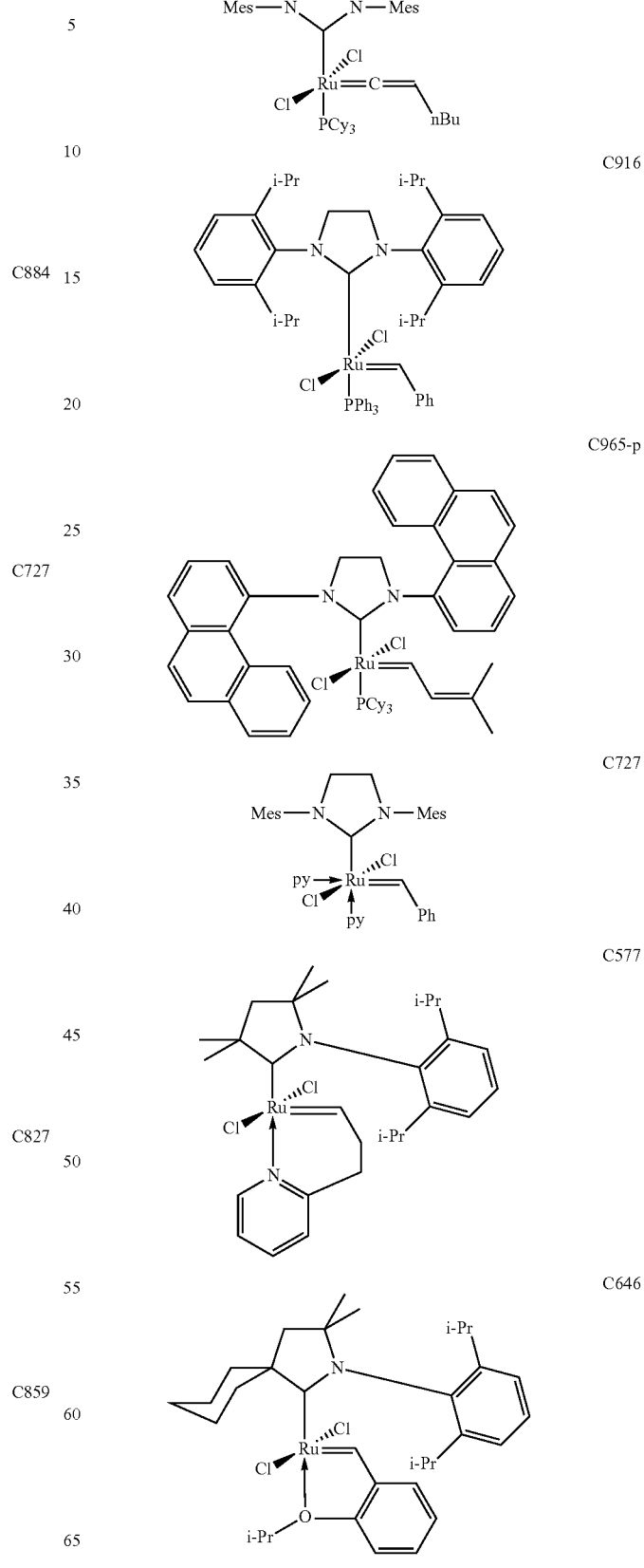

-continued
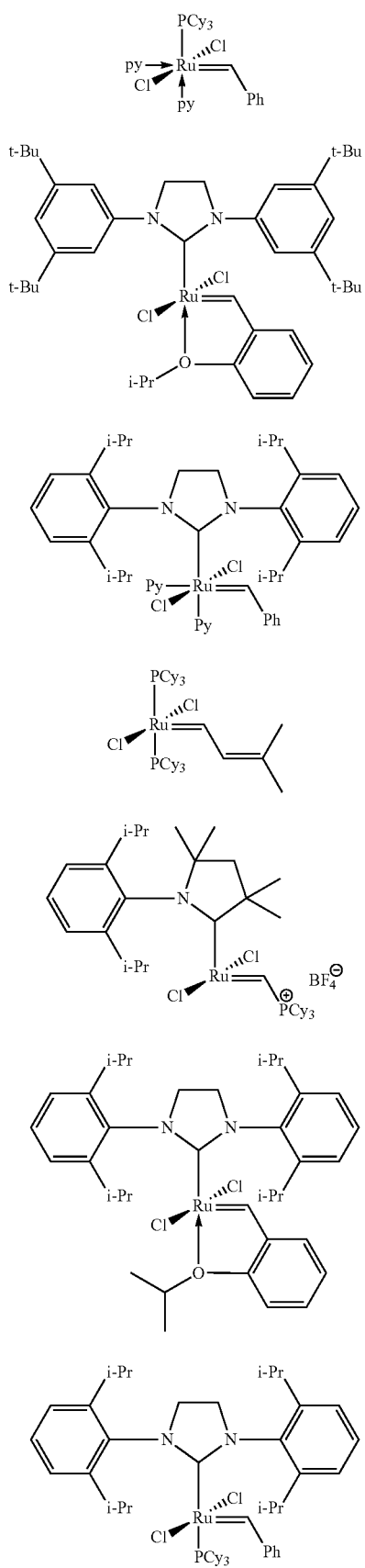
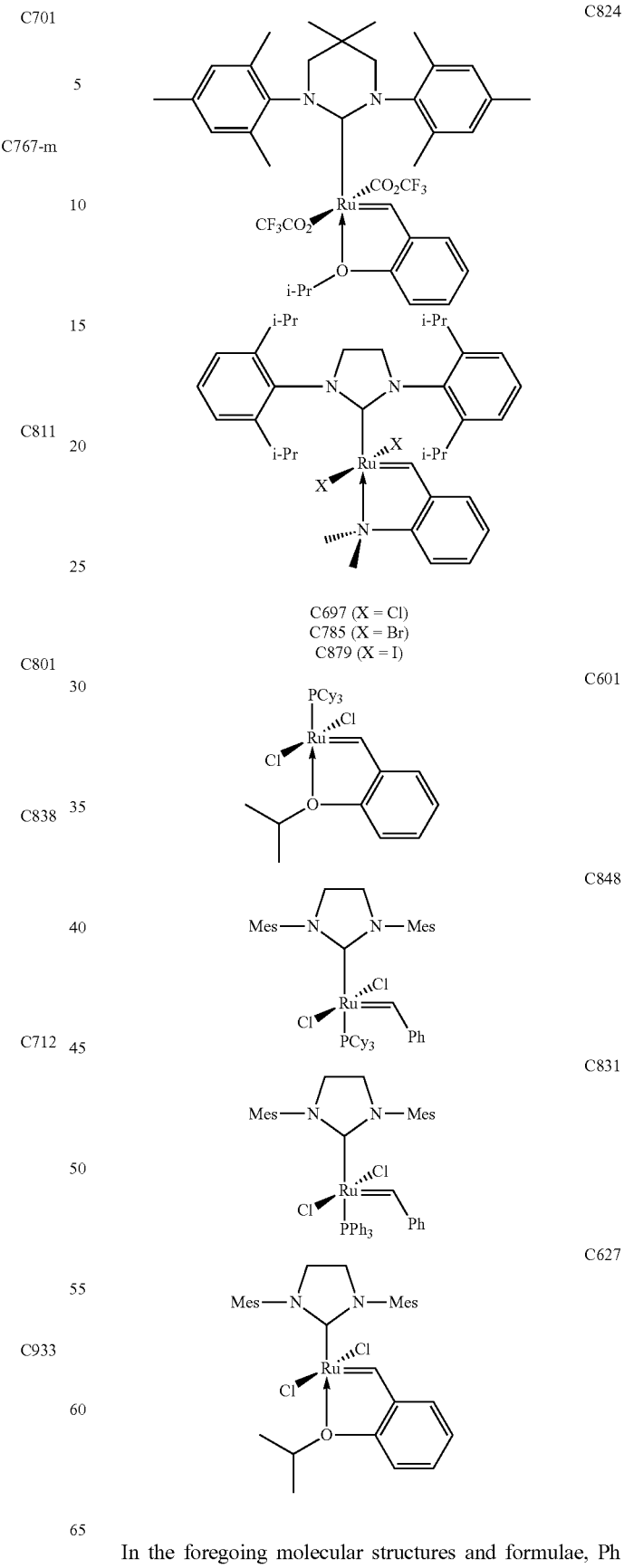
In the foregoing molecular structures and formulae, Ph represents phenyl, Cy represents cyclohexyl, Me represents methyl, nBu represents n-butyl, i-Pr represents isopropyl, py represents pyridine (coordinated through the N atom), and Mes represents mesityl (i.e., 2,4,6-trimethylphenyl).

Further examples of catalysts useful in the reactions disclosed herein include the following: ruthenium (II) dichloro (3-methyl-1,2-butenylidene) bis(tricyclopentyl-phosphine) (C716); ruthenium (II) dichloro (3-methyl-1,2-butenylidene) bis(tricyclohexylphosphine) (C801); ruthenium (II) dichloro (phenylmethylene) bis(tricyclohexylphosphine) (C823); ruthenium (II) [1,3-bis-(2,4,6-trimethylphenyl)-2-imidazolidinylidene) dichloro (phenylmethylene) (triphenylphosphine) (C830), and ruthenium (II) dichloro (vinyl phenylmethylene) bis(tricyclohexylphosphine) (C835); ruthenium (II) dichloro (tricyclohexylphosphine) (o-isopropoxyphenylmethylene) (C601), and ruthenium (II) (1,3-bis-(2,4,6,-trimethylphenyl)-2-imidazolidinylidene) dichloro (phenylmethylene) (bis 3-bromopyridine (C884)).

Still further catalysts useful in the ring-opening methathesis reactions disclosed herein include the following, identified as structures 60-68:

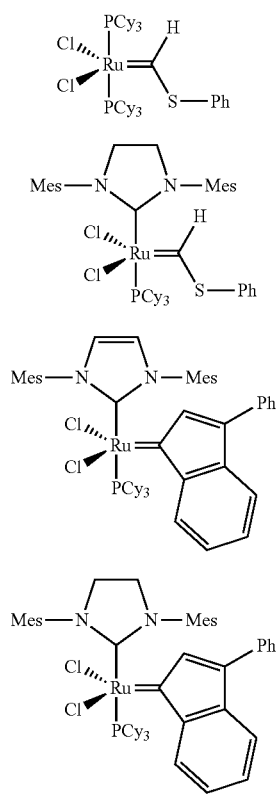

The transition metal complexes used as catalysts herein can be prepared by several different methods, such as those described by Schwab et al. (1996) *J. Am. Chem. Soc.* 118: 100-110, Scholl et al. (1999) *Org. Lett.* 6:953-956, Sanford et al. (2001) *J. Am. Chem. Soc.* 123:749-750, U.S. Pat. No. 5,312,940 and U.S. Pat. No. 5,342,909. Also see U.S. Patent Publication No. 2003/0055262 to Grubbs et al. filed Apr. 16, 2002 for "Group 8 Transition Metal Carbene Complexes as Enantioselective Olefin Metathesis Catalysts", International Patent Publication No. WO 02/079208 application Ser. No. 10/115,581 to Grubbs, Morgan, Benitez, and Louie, filed Apr. 2, 2002, for "One-Pot Synthesis of Group 8 Transition Metal Carbene Complexes Useful as Olefin Metathesis Catalysts," commonly assigned herewith to the California Institute of Technology. Preferred synthetic methods are described in International Patent Publication No. WO 03/11455A1 to Grubbs et al. for "Hexacoordinated Ruthenium or Osmium Metal Carbene Metathesis Catalysts," published Feb. 13, 2003.

The components of the reactions disclosed herein may be combined in any order, and it will be appreciated that the order of combining the reactants may be adjusted as needed. For example, the olefinic compound may be added to the cyclic olefin, followed by addition of the catalyst. Alternatively, the olefinic compound and cyclic olefin may be added to the catalyst. When one of the reactants is a gas, it may be necessary to add the catalyst to the liquid or solid reactant before introducing the gaseous reactant.

The catalyst may be added to the reaction either as a solid, dissolved in one of the reactants, or dissolved in a solvent.

The reactions disclosed herein may be carried out in a solvent, and any solvent that is inert towards cross-metathesis may be employed. Generally, solvents that may be used in the metathesis polymerization reactions include organic, protic, or aqueous solvents, such as aromatic hydrocarbons, chlorinated hydrocarbons, ethers, aliphatic hydrocarbons, alcohols, water, or mixtures thereof. Example solvents include benzene, toluene, p-xylene, methylene chloride, 1,2-dichloroethane, dichlorobenzene, chlorobenzene, tetrahydrofuran, diethylether, pentane, methanol, ethanol, water, or mixtures thereof. In a preferred embodiment, the reactions disclosed herein are carried out neat, i.e., without the use of a solvent.

It will be appreciated that the temperature at which a metathesis polymerization reaction according to methods disclosed herein is conducted can be adjusted as needed, and may be at least about −78° C., −40° C., −10° C., 0° C., 10° C., 20° C., 25° C., 35° C., 50° C., 70° C., 100° C., or 150° C., or the temperature may be in a range that has any of these values as the upper or lower bounds. In a preferred embodiment, the reactions are carried out at a temperature of at least about 35° C., and in another preferred embodiment, the reactions are carried out at a temperature of at least about 50° C.

It will further be appreciated that the molar ratio of the reactants will be dependent upon the identities of the reactants and the desired products. Although the cyclic olefin and the olefinic substrate may be used in equal molar amounts, in general, an excess of cyclic olefin with respect to the olefinic substrate will be present. For example, the molar ratio of the cyclic olefin (as the sum of all compounds when the cyclic olefin comprises a plurality of cyclic compounds) to the olefinic substrate may be up to 2:1, 5:1, 10:1, 25:1, 50:1, 100:1, 250:1, 500:1, 1000:1, 5000:1, 10,000:1, 50,000:1, or 100,000:1, or within a range that has any of these values as the upper or lower bounds.

When the cyclic olefin comprises two or more cyclic olefins, the molar ratio of the two or more cyclic olefins will vary depending on the desired products. For example, the molar ratio of two cyclic olefins may be 100:1, 50:1, 25:1, 10:1, 5:1, 2:1, 1:1, 1:2, 1:5, 1:10, 1:25, 1:50, or 1:100, or within a range that has any of these values as the upper or lower bounds.

Polymers formed according to the invention may be further treated as desired according to methods known in the art. For example, methods suitable for carrying out the partial or complete hydrogenation of the polymers are known in the art, and any appropriate hydrogenation method may be employed. Typically, such methods involve placing an unsaturated polymer in a suitable container, introducing a hydrogenation catalyst, if necessary, and introducing a hydrogen source. Suitable methods for hydrogenation may be found, for example, in Smith et al. *March's Advanced Organic Chemistry, 5th Edition* (Wiley: New York, 2001).

The hydrogenation of the metathesis polymers of the invention may be carried out with or without isolation of the other products from the metathesis reaction. It will be appreciated that the hydrogenation reaction will, in some instances, be affected by the purity of the reaction mixture and the presence of impurities from the metathesis reaction. In such cases, the yield of the hydrogenated polymer can be maximized by isolating and purifying the metathesis reaction product before hydrogenation is performed.

Any catalyst suitable for hydrogenating the olefinic products may be employed, and appropriate catalysts may also be found, for example, in Smith et al. *March's Advanced Organic Chemistry, 5th Edition* (Wiley: New York, 2001). In one example, the ruthenium alkylidene metathesis catalyst that is used for the metathesis reaction may also be employed as the hydrogenation catalyst. In this embodiment, it is not necessary to add a further hydrogenation catalyst to the reaction mixture in order to perform the hydrogenation.

The metathesis products from the methods disclosed herein are useful, for example, as telechelic polymers for use in urethane reaction systems, latex paints, printing inks and as high melting point waxes. As described hereinabove, the double bonds may be partially or completely hydrogenated to produce products of varying utility.

It is to be understood that while the invention has been described in conjunction with specific embodiments thereof, that the description above as well as the examples that follow are intended to illustrate and not limit the scope of the invention. Other aspects, advantages, and modifications within the scope of the invention will be apparent to those skilled in the art to which the invention pertains.

EXPERIMENTAL

In the following examples, efforts have been made to ensure accuracy with respect to numbers used (e.g., amounts, temperature, etc.) but some experimental error and deviation should be accounted for. Unless indicated otherwise, temperature is in degrees C. and pressure is at or near atmospheric.

EXAMPLES

Materials and methods: Soy FAME was obtained from Cargill, Incorporated. Jojoba oil was obtained from Desert King International. Leaf alcohol (cis-3-hexen-1-ol) was obtained from Bedoukian Research, Inc. Irganox® 1076 antioxidant was obtained from Ciba Specialty Chemicals Inc. 1,10-Diacetoxy-5-decene was prepared as described by Pederson, et al., in *Adv. Synth. Catal.*, 2002, 344, 728-735. All reactions were carried out as specified therein in the Examples that follow. Catalysts are referenced using their molecular weights, as described hereinabove. When indicated below, metathesis reactions were quenched and ruthenium residues were removed via use of the tris(hydroxymethyl)phosphine (THMP) reagent as described by Maynard, et al., in *Tetrahedron Letters*, 1999, 40(22), 4137-4140. The following abbreviations for cyclic olefins are utilized herein:

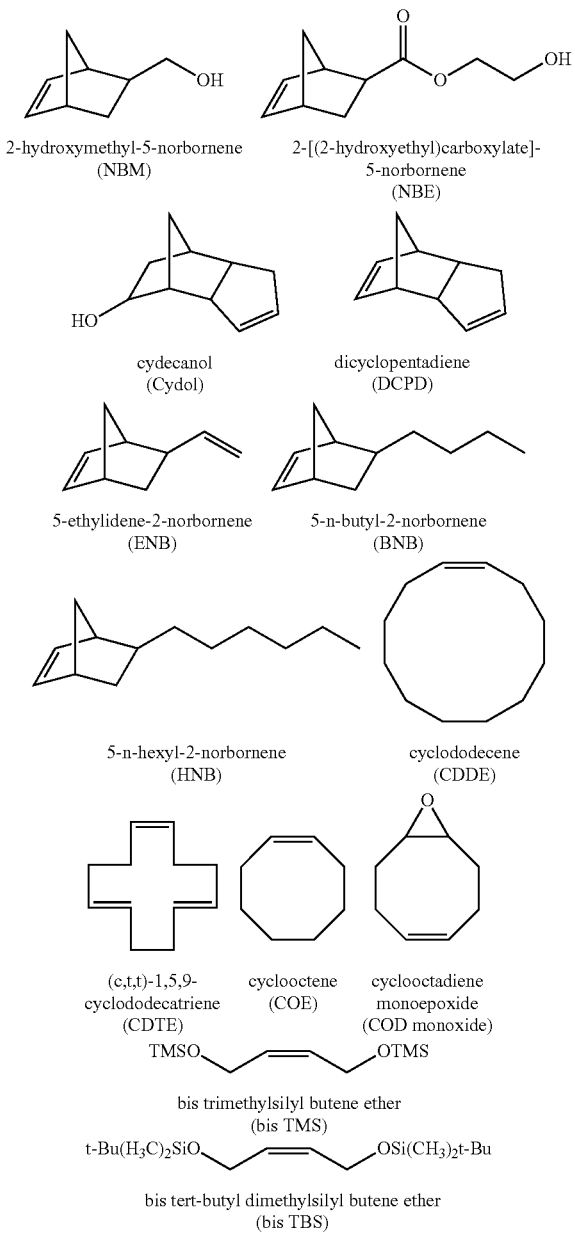

Example 1

Synthesis of Octadec-9-en-1,18-dioic Acid Dimethyl Ester (9C18-DME) from Soy Fatty Acid Methyl Ester (FAME)

A 50 gal reactor was charged with 222 lbs (101 kg) soy FAME, 2.50 kg Magnesol® XL (the Dallas Group of America Inc.), 1.50 kg bleaching powder and 1.53 kg Celite. The mixture was purged with a stream of Ar and stirred at 80° C. overnight. After 15 hours the mixture was cooled to room temperature while stirring under Ar, then after 22 hours this was filtered under vacuum through a 20 in. filter cartridge (0.5 μm pore Polyflow-C, PTI Advanced Filtration) to give a clear golden oil which was stored under Ar in the presence of 10 ppm BHT. Recovery of purified soy FAME was 201 lbs, 90.5%.

A 50 gal reactor was charged with 201 lbs (91 kg) purified soy FAME, degassed under vacuum and back-filled with Ar three times. C827 (19.44 g, 50 ppm per C═C assuming 1.5 C═C eq. per soy FAME) was added to the cooled soy FAME under Ar, rinsing the container with ca. 10 ml $CH_2Cl_2$. But-1-ene (34.0 kg, 1.3 eq. per C═C) was then added to the mixture (using two cylinders concurrently) and the reactor temperature was increased slowly (ca. 1 hr) to 60° C., achieving a final pressure of 80 psi. Aliquots were removed after 1 hr, 2 hr and 2.5 hrs, each quenched with THMP in IPA and analyzed by GC. After 3 hours the reactor was vented into the fume hood (ca. 3 hrs vent time), the mixture was cooled to room temperature and THMP (1.92 M in IPA, 611 mL, 50 mol. eq. per Ru) was added. The mixture was purged with Ar, heated to 60° C. and stirred under Ar overnight. The mixture was cooled to room temperature and vented to the fume hood, after which deionized $H_2O$ (4 gal.) was added. The mixture was stirred for 10 minutes, left to settle for 10 minutes and the aqueous layer (yellow) removed and discarded. This wash was repeated with NaCl solution (aq., sat., 2 gal.) and the aqueous layer (colorless) again discarded. After an additional hour standing the remaining aqueous phase (ca. 30 mL) was discarded. Fractional distillation of the mixture afforded 18 kg combined fractions of a mixture of dec-9-enoic acid methyl ester (9DA) and dodec-9-enoic acid methyl ester (9DDA).

The mixture of 9-DA/9-DDA (1.836 kg) was placed in a 10 L RBF and purged with $N_2$ for 1 hr while stirring. C827 (716 mg) was added as a solid, and the mixture was heated to 60° C. under vacuum (Teflon diaphragm pump). Gas evolution was observed after ~20 mins, which ceased after ~2 hrs. GC analysis of an aliquot after 4 hrs suggested only ~65% conversion had been achieved, so the reaction was run under $N_2$ overnight. GC analysis the next day suggested conversion had been increased to ~90%. THMP (2M in IPA, 10 mL) was added to the mixture and stirred at 60° C. for 1 hr. After subsequent cooling to room temperature, water (1 L) was added, and the organic layer separated. This organic layer was washed with sat. $NaHCO_3$ (aq., 1 L), and sat. NaCl (aq., 1 L), dried over $Na_2SO_4$ and filtered. Hexane (~1 L) was added and the solution subsequently cooled to −15° C. overnight. White solid was collected by filtration, washed with cold hexanes and dried under vacuum; a second crop was collected from the filtrate upon concentration and cooling. Total combined yield of 9C18-DME 815.7 g, 70% (based on 9-DA/9-DDA fractions). GC analysis showed that this sample was >98% pure. Further purification was achieved by filtration of a solution in hexane through $SiO_2$, followed by cooling to 0° C., affording 600 g white crystals of >99% purity by GC analysis.

Example 2

Synthesis of 1,18-dihydroxyoctadec-9-ene (9C18-diol) from 9C18-DME

9C18-DME (11.3 g) was dissolved in anhydrous toluene (40 mL) and the mixture purged with Ar for 20 minutes, and then cooled to 0° C. using an ice/salt bath. An Ar-flushed addition funnel was charged with Vitride (~70% solution in toluene, 26.3 g), which was then added to the cooled, stirred 9C18-DME solution over 1 hr. After addition was complete the mixture was allowed to warm to room temperature over 1 hr, after which an aliquot removed for 1H NMR analysis revealed that no 9C18-DME remained. A solution of 2-propanol in $CH_2Cl_2$ (~50% by volume, 50 mL) was added slowly, followed by careful addition of distilled water (100 mL). The organic and aqueous fraction were separated, and the aqueous fraction was extracted with additional $CH_2Cl_2$ (50 mL). The organic fractions were combined, washed with distilled water (2×100 mL), dried over $MgSO_4$, filtered, and the filtrate reduced in volume in vacuo. Cooling the filtrate to ~0° C. overnight resulted in the formation of white crystals which were collected by filtration and dried in air. Further reduction of the filtrate and cooling resulted in a second crop of white crystals; combined yield 8.8 g 9C18-diol, 94%.

Example 3

Synthesis of α,ω-diols from Jojoba Alcohols (Mixture of Octadec-9-en-1-ol, Eicos-11-en-1-ol and Docos-13-en-1-ol) for use as CTAs A 5 L 3-neck RBF was equipped with an overhead mechanical stirrer, argon gas inlet and a gas inlet attached to a bubbler. The flask was charged with 1 L jojoba alcohols derived from the saponification of jojoba oil and 2 L hexanes. The solution was stirred vigorously and sparged with argon for 30 min. During that time, the flask was cooled in an ice bath (temp held between 2-10° C.). After cooling for 1 hr, a solution of C627 (533 mg, 250 ppm or 0.025 mol %) in 3 mL $CH_2Cl_2$ was added to the flask. The rxn was for 6 hrs while the ice bath was maintained at 2-10° C. After 6 hrs, the stirring was stopped and the solid allowed to settle overnight.

After settling 15 hrs, the liquid was removed by stick filtration and the solid washed with hexanes (2×1 L). The solid was dried in vacuo overnight. Yield=274 g, white powdery solid identified as 16% hydrocarbons, 76% diols by GC. 274 g×0.76=208 g diol in mixture; 208 g/314 g=0.66, 66% yield.

In a variation of this method, addition of 2-propanol to the reaction mixture resulted in the recovered product containing less hydrocarbon byproduct by GC: 11% hydrocarbons, 86% diol; although overall yield was reduced (57%).

Example 4

Synthesis of 1,10-dihydroxy-dec-5-ene (5-C10 Diol)

In a 500-mL round bottom flask, 100 g 1,10-diacetoxy-5-decene was combined with 0.5 g phase transfer catalyst (benzyltriethylammonium chloride, $BzNEt_3Cl$). A 50% aqueous solution of 35 g NaOH was prepared and added to the reaction flask. Flask was heated to 60° C. using a temperature-controlled oil bath, and maintained at 60° C. overnight. The reaction mixture was then transferred to a separatory funnel and washed with 5×50 mL DI water. As washes were still significantly basic, a small amount of "dilute HCl" was added, followed by 4×50 mL water washes. Organic layer was dried over $NaSO_4$ overnight.

Example 5

Synthesis of 1,6-diacetoxy-hex-3-ene

Acetoxy-protected leaf alcohol (1-acetyl-3-hexene), prepared from leaf alcohol using standard protection chemistry techniques, was filtered through activated alumina into a round bottom flask. The flask was evacuated and backfilled with nitrogen thrice then cooled in an ice water bath and fitted with a condenser to prevent vapor loss. A solution of C627 (500 ppm versus 1-acetyl-3-hexene) was prepared in degassed toluene. Dynamic vacuum was applied to the flask, and the catalyst solution was added via syringe. The reaction was maintained at 5° C. under dynamic vacuum for 1 hour, monitored by GC.

Example 6

Synthesis of 1,6-dihydroxy-hex-3-ene (3-C6 Diol)

In a 50-mL round bottom flask, 10 g 1,6-diacetoxy-3-hexene was combined with 16 g (10 eq) methanol. Sodium methoxide (0.14 g, 0.05 eq) was added while stirring at room temperature. The reaction flask was capped with a condenser and placed under nitrogen blanket. Upon complete dissolution of the sodium methoxide, the flask was heated to 60° C. via oil bath. The reaction was allowed to proceed for 5 hours, monitored by GC. Methanol was removed from the reaction mixture by rotary evaporation. Pure 3-C6 diol was isolated by distillation.

Examples 7A, 7B, 7C

Synthesis of di-acetoxy Telechelic Polyoctenamer Polymers from Cyclooctene (COE) and 1,4-diacetoxy-2-butene (DAB) as CTA (Control)

A polymerization via ring-opening metathesis of cis-cyclooctene (COE) with DAB as CTA was performed at 30% solids in THF. The CTA at the corresponding molar equivalents shown in Table 1 was added to the THF (16 mL) in the reactor. When dissolution of the CTA was complete, COE (6.6 grams) was added to the reaction mixture. The headspace of the reactor was purged with argon, and the vials were heated to 60° C. with magnetic stirring. The catalyst C827 (1.5 mg, 30 ppm) was added via a stock solution in THF. After 16 hrs. an additional charge of catalyst C827 (1.5 mg, 30 ppm) was added to the reaction mixture. After an additional 16 hours of reaction, a sample was taken from the reaction for analysis. Results of the analyses are summarized in Table 1.

Examples 8A, 8B, 8C

Synthesis of Hydroxy Telechelic Polyoctenamer Polymers from Cyclooctene (COE) and 1,4-butene-diol (2-C4 Diol)

These syntheses were carried out in the same manner as Examples 7A, 7B, 7C with the substitution of 2-C4-diol as CTA. Results are summarized in Table 1 and demonstrate the poor conversion of monomer to polymer and the lack of control over molecular weight distribution. The GPC elution chromatographs are reproduced in FIG. 1 and further demonstrate the poor conversion of monomer (peak around 41-42 minutes) to polymer (peaks around 25-35 minutes).

Examples 9A, 9B, 9C

Synthesis of Hydroxy Telechelic Polyoctenamer Polymers from Cyclooctene (COE) and 1,6-dihydroxy-hex-3-ene (3-C6 Diol)

This synthesis was carried out in the same manner as Examples 7A, 7B, 7C with the substitution of 3-C6-diol as CTA. Results are summarized in Table 1 and demonstrate good control over molecular weight and molecular weight distribution.

Examples 10A, 10B, 10C

Synthesis of Hydroxy Telechelic Polyoctenamer Polymers from Cyclooctene (COE) and 1,10-dihydroxy-dec-5-ene (5-C10 Diol)

Figure 2:
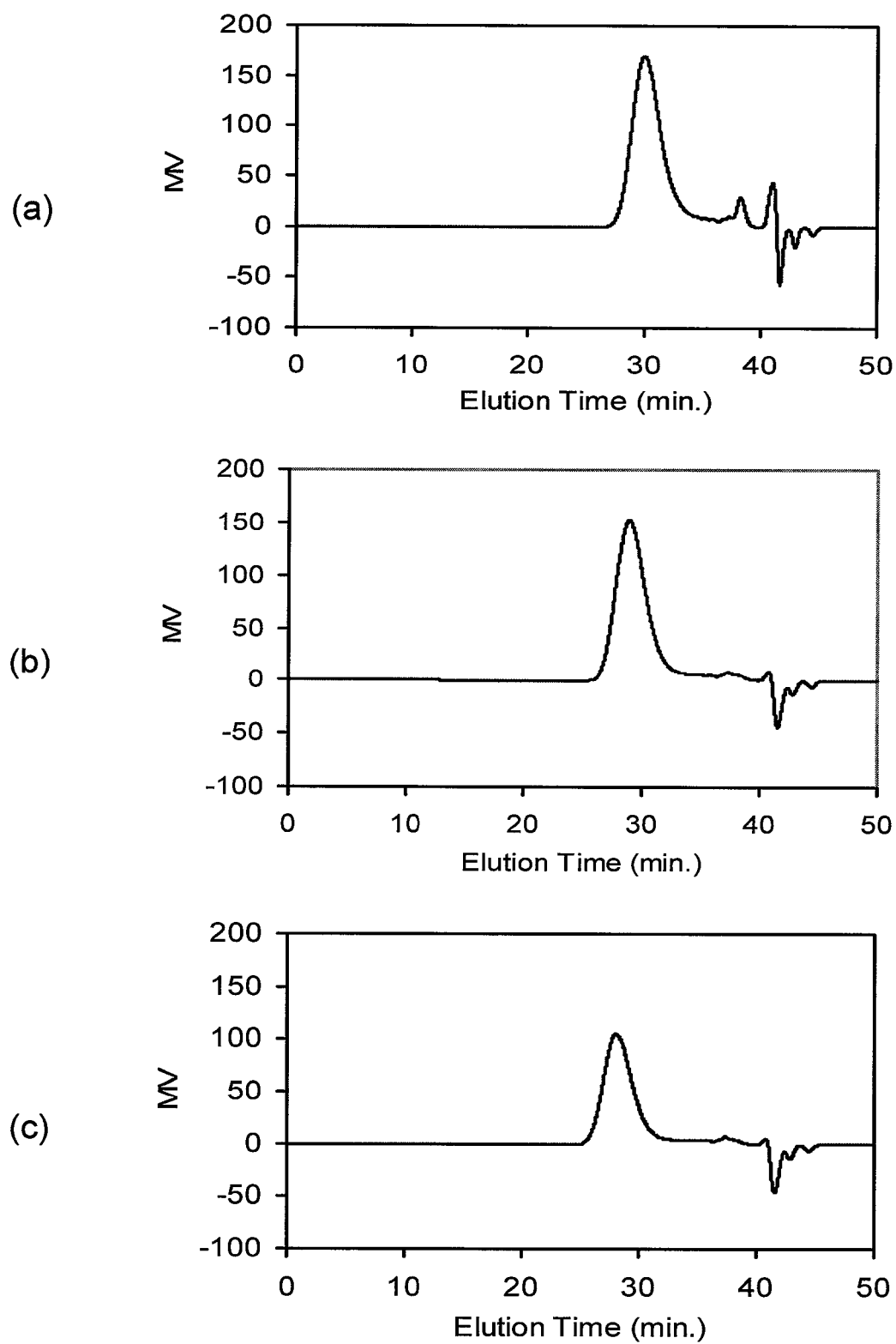
FIG. 2 depicts GPC elution chromatograph of (a) Examples 10A, (b) 10B, and (c) 10C from 3-C6 diol as chain transfer agent.

This synthesis was carried out in the same manner as Examples 7A, 7B, 7C with the substitution of 5-C10-diol as CTA. Results are summarized in Table 1 and demonstrate good control over molecular weight and molecular weight distribution. The GPC elution chromatographs are reproduced in FIG. 2 and further demonstrate the good conversion of monomer (peak around 41-42 minutes) to polymer (peaks around 25-35 minutes).

Examples 11A, 11B, 11C

Synthesis of Hydroxy Telechelic Polyoctenamer Polymers from Cyclooctene (COE) and 1,18-dihydroxy-octadec-9-ene (9-C18 Diol)

This synthesis was carried out in the same manner as Examples 7A, 7B, 7C with the substitution of 9-C18-diol as CTA. Results are summarized in Table 1 and demonstrate good control over molecular weight and molecular weight distribution.

TABLE 1

Polymerization Results for Examples 7-11

| Example No. | CTA | CTA:COE Molar Ratio | Target Mn (kDa) | Conv. (%) | Mn (kDa) | PDI |
| --- | --- | --- | --- | --- | --- | --- |
| 7A | DAB | 18 | 2 | 99 | 2.7 | 1.8 |
| 7B | DAB | 91 | 10 | >99 | 10.1 | 1.7 |
| 7C | DAB | 181 | 20 | >99 | 20.2 | 1.7 |
| 8A | 2-C4 diol | 18 | 2 | 10 | 1.9 | 1.5 |
| 8B | 2-C4 diol | 91 | 10 | 13 | 6.8 | 2.7 |
| 8C | 2-C4 diol | 181 | 20 | 9 | 19.9 | 1.8 |
| 9A | 3-C6 diol | 18 | 2 | 90 | 4.9 | 1.7 |
| 9B | 3-C6 diol | 91 | 10 | 100 | 9.9 | 1.7 |
| 9C | 3-C6 diol | 181 | 20 | 100 | 16.9 | 1.7 |
| 10A | 5-C10 diol | 18 | 2 | 99 | 2.4 | 1.8 |
| 10B | 5-C10 diol | 91 | 10 | 96 | 8.1 | 1.8 |
| 10C | 5-C10 diol | 181 | 20 | 94 | 15.0 | 1.7 |
| 11A | 9-C18 diol | 18 | 2 | 97 | 2.0 | 2.1 |
| 11B | 9-C18 diol | 91 | 10 | 97 | 8.7 | 1.7 |
| 11C | 9-C18 diol | 181 | 20 | 92 | 17.2 | 1.6 |

Example 12

Synthesis of Hydroxyl Telechelic Octenamer Polymers from Cyclooctene (COE) and 1,10-dihydroxy-dec-5-ene (5-C10 diol), Catalyzed by (1,3-Bis-(2,4, 6-trimethylphenyl)-2-imidazolidinylidene)Dichloro (o-isopropoxyphenylmethylene)Ruthenium (C627)

A polymerization via ring-opening metathesis of COE and 5-C10 diol was run at 71% solids in THF, using 30 ppm of catalyst C627. Catalyst was added to a 25-mL side-arm flask. The flask was capped with a rubber septum and evacuated and backfilled thrice with argon. A mixture of COE, 5-C10 diol, and THF was prepared and sparged with argon. The required amount of solution was added by syringe to the reaction flask at room temperature with magnetic stirring. An exotherm was observed, and the flask was briefly vented to the atmosphere to release pressure. NMR and GPC samples were taken after 2.5 hours. Results are summarized in Table 2 and compared with other catalysts.

Example 13

Synthesis of Hydroxyl Telechelic Octenamer Polymers from Cyclooctene (COE) and 1,10-dihydroxy-dec-5-ene (5-C10 diol), Catalyzed by Benzylidene-bis(Tricyclohexylphosphine)Dichlororuthenium (C823)

This synthesis was carried out in the same manner as Example 12 using 600 ppm C823. The synthesis of was carried out at 20° C. for the first 20 hours. Samples taken at that time period indicated that the reaction was not complete (conversion<90%). Therefore, the temperature was increased to 45° C. for 48 hrs. Samples were taken for analysis after this time and reported in Table 2, which shows that varied types of ruthenium-based olefin metathesis catalysts give very similar results with the diols of the present invention.

TABLE 2

Polymerization Results with Different Catalysts

| Example No. | CTA | Catalyst | CTA:COE Molar Ratio | Target Mn (kDa) | Conv. (%) | Mn (kDa) | PDI |
|---|---|---|---|---|---|---|---|
| 10A | 5-C10 diol | C827 | 18 | 2 | 99 | 2.4 | 1.8 |
| 12 | 5-C10 diol | C627 | 18 | 2 | >99 | 2.1 | 1.8 |
| 13 | 5-C10 diol | C823 | 18 | 2 | 95 | 2.5 | 1.8 |

Example 14

Synthesis of Hydroxytelechelic Poly(Butadiene) from COD and 1,4-diacetoxybut-2-ene (DAB), Followed by Hydrolysis DAB (~75%, 131.24 g) and COD (distilled to remove vinylcyclohexene impurity, 940 g) were dissolved in anhydrous toluene (400 mL), and the mixture was purged with Ar for 30 minutes. The mixture was then heated to 60° C., a solution of C827 (180 mg) in anhydrous toluene (2 mL) added by syringe and the mixture stirred overnight under Ar. Irganox® 1076 was added (~200 ppm) and the mixture was then cooled, filtered through a short $SiO_2$ plug washed with toluene, and added dropwise to a solution of BHT (~1,000 ppm) in acidified MeOH (~5 L) cooled to ~0° C., affording a thick waxy oil which was isolated by decantation, washed with MeOH (2×1 L), separated by decantation and dried under vacuum at 60° C. overnight to afford a white waxy solid at room temperature. $^1H$ and $^{13}C$ NMR spectroscopy, GPC, DSC and TGA supported characterization as a difunctional DAB-capped telechelic poly(butadiene). Yield 942 g, 91%. Mn 1,700 (theoretical), 1,750 (1H NMR, assuming difunctional), 1,680 (GPC(RI); PDI=1.93).

A sample of this DAB-capped telechelic poly(butadiene) (503 g) was then suspended/dissolved in a heptane/water mixture (400/650 mL) to which potassium hydroxide (65 g) and myristyltrimethyl ammonium bromide (4 g) were added, and the mixture then purged with Ar for 45 minutes. The mixture was then stirred and heated to 95° C. overnight under Ar. The mixture was cooled and $CH_2Cl_2$ (1 L) and distilled water (1 L) added. The organic layer was separated and washed with aqueous brine solution (2×200 mL), dried over $MgSO_4$ and decolorizing charcoal and filtered through a short $SiO_2$ plug with $CH_2Cl_2$. The pale yellow filtrate was dried in vacuo to afford a pale yellow oil which solidified at room temperature. $^1H$ and $^{13}C$ NMR spectroscopy, GPC, DSC and TGA supported characterization as a difunctional hydroxytelechelic poly(butadiene). Yield 440 g, 87%. Mn 1,990 ($^1H$ NMR, assuming difunctional), 1,880 (GPC(RI); PDI=1.67). End-group titration of the product of reaction of this material with p-toluenesulfonyl isocyanate in THF/acetonitrile using $nBu_4NOH$ in 2-propanol/methanol revealed a OH— equivalence of 1.03 meq/g (equivalent to a mass of 1,941 g mol$^{-1}$ for difunctional material).

Example 15

Synthesis of Hydroxytelechelic Poly(Octeneamer) from COE and 9C18-diol

9C18-diol (3.44 g) and COE (95%, 21.05 g) were dissolved in anhydrous toluene (60 mL) and the mixture purged with Ar for 30 minutes. The mixture required heating for the 9C18 diol to fully dissolve. The mixture was then stirred, heated to 60° C. under Ar and C827 (4 mg) dissolved in anhydrous toluene (1 mL) added by syringe. The mixture was then stirred under Ar at 60° C. overnight. Irganox® 1076 was added (~200 ppm) and the mixture was then cooled, filtered through a short $SiO_2$ plug washed with toluene, and added dropwise to a solution of BHT (~1000 ppm) in MeOH (~400 mL), affording a white powder which was isolated by decantation, washed with MeOH (2×100 mL), separated by decantation and dried under vacuum overnight at 50° C. $^1H$ and $^{13}C$ NMR spectroscopy, GPC, DSC and TGA supported characterization as a difunctional hydroxytelechelic poly(octeneamer). Yield 20.5 g, 87%. Mn 2,000 (theoretical), 2,740 ($^1H$ NMR, assuming difunctional), 2,835 (GPC(RI); PDI=1.47). Before workup: 1,946 (GPC(RI); PDI=2.00). Remaining low-MW hydroxytelechelic poly(octeneamer) material may be obtained by washing the $SiO_2$ plug with $CH_2Cl_2$ and drying in vacuo.

Example 16

Synthesis of Hydroxytelechelic Poly(Butadiene) from CDTE and 9C18-diol

9C18-diol (1.6 g) and CDTE (purified over Magnesol® XL, 9.6 g) were dissolved in anhydrous toluene (30 mL) and the mixture purged with Ar for 30 minutes. The mixture required heating for the 9C18 diol to fully dissolve. The mixture was then stirred, heated to 60° C. under Ar and C827 (2 mg) dissolved in anhydrous toluene (0.5 mL) added by syringe. The mixture was then stirred under Ar at 60° C. overnight. Irganox® 1076 was added (~200 ppm) and the mixture was then cooled, filtered through a short $SiO_2$ plug washed with toluene, and added dropwise to a solution of BHT (~1,000 ppm) in MeOH (~300 mL), affording a white powder which was isolated by decantation, washed with MeOH (2×100 mL), separated by decantation and dried under vacuum overnight at 50° C. $^1H$ and $^{13}C$ NMR spectroscopy, GPC, DSC and TGA supported characterization as a difunctional hydroxytelechelic poly(butadiene). Yield 10 g, 89%. Mn 2,000 (theoretical), 3,100 ($^1H$ NMR, assuming difunctional), 3,150 (GPC (RI); PDI=1.47). Before workup: 1,890 (GPC (RI); PDI=1.93). Remaining low-MW hydroxytelechelic poly(butadiene) material may be obtained by washing the $SiO_2$ plug with $CH_2Cl_2$ and drying in vacuo.

Example 17

Synthesis of Hydroxytelechelic Poly(Octeneamer) from COE and α,ω-diols Derived from Jojoba Alcohols in Example 3

α,ω-diols derived from jojoba alcohols (a mixture of 9C18, 11C22 and 13C26 diols, 4.15 g) and COE (95%, 21.05 g) were dissolved in anhydrous toluene (60 mL) and the mixture purged with Ar for 30 minutes. The mixture required heating for the diols to fully dissolve. The mixture was then stirred, heated to 60° C. under Ar and C827 (4 mg) dissolved in anhydrous toluene (1 mL) added by syringe. The mixture was then stirred under Ar at 60° C. overnight. Irganox® 1076 was added (~200 ppm) and the mixture was then cooled, filtered through a short $SiO_2$ plug washed with toluene, and added dropwise to a solution of BHT (~1000 ppm) in MeOH (~400 mL), affording a white powder which was isolated by decantation, washed with MeOH (2×100 mL), separated by decantation and dried under vacuum overnight at 50° C. $^1$H NMR spectroscopy and GPC supported characterization as a hydroxytelechelic poly(octeneamer). Yield 20 g, 83%. Mn 2,000 (theoretical), 1,665 (GPC(RI); PDI=1.92), before workup).

What is claimed is:

1. A method for carrying out a catalytic ring-opening metathesis polymerization reaction, comprising contacting
   (a) at least one olefinic compound selected from an unsaturated diol having a carbon chain length of greater than $C_4$, wherein the unsaturated diol is derived from a monoglyceride, a diglyceride, a triglyceride, or a mixture thereof; is derived from a seed oil, or a mixture of seed oils; has the structure of formula (A)

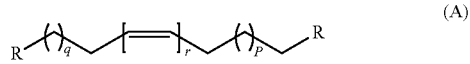

(A)

wherein,
   R is an —OH group;
   r is 1, 2, or 3; and
   p and q are independently from 0 to 30, provided that at least one of p and q is not zero; is derived from an unsaturated fatty acid, fatty acid ester, or fatty alcohol or a mixture thereof; or is derived from cross metathesis of fatty acids, fatty acid esters, or fatty alcohols or mixtures thereof, with
   (b) at least one cyclic olefin, in the presence of
   (c) an alkylidene olefin metathesis catalyst,
   (d) under conditions effective to allow ring-opening metathesis polymerization of the cyclic olefin, whereby the cyclic olefin polymer formed thereby is terminated with the hydroxyl groups of the unsaturated diol.

2. The method of claim 1, wherein the cyclic olefin is functionalized.

3. The method of claim 1, wherein the unsaturated diol contains terminal —OH groups.

4. The method of claim 1, wherein the cyclic olefin is an optionally substituted, optionally heteroatom-containing, mono-unsaturated, di-unsaturated, or poly-unsaturated $C_5$ to $C_{24}$ hydrocarbon.

5. The method of claim 4, wherein the cyclic olefin is a mono-unsaturated, di-unsaturated, or poly-unsaturated $C_6$ to $C_{16}$ hydrocarbon optionally substituted with one or two hydroxyl groups and optionally containing an ester linkage.

6. The method of claim 5, wherein the cyclic olefin is mono-unsaturated, di-unsaturated, or tri-unsaturated.

7. The method of claim 6, wherein the cyclic olefin is mono-unsaturated.

8. The method of claim 1, wherein the alkylidene olefin metathesis catalyst has the structure of formula (II)

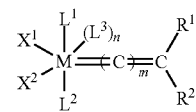

(II)

wherein:
   M is ruthenium or osmium;
   n is 0 or 1;
   m is 0, 1, or 2;
   $L^1$, $L^2$ and $L^3$ are neutral electron donor ligands;
   $X^1$ and $X^2$ are anionic ligands; and
   $R^1$ and $R^2$ are independently selected from hydrogen, hydrocarbyl, substituted hydrocarbyl, heteroatom-containing hydrocarbyl, substituted heteroatom-containing hydrocarbyl, and functional groups;
   wherein any two or more of $X^1$, $X^2$, $L^1$, $L^2$, $L^3$, $R^1$, and $R^2$ can be taken together to form a cyclic group, and further wherein any one or more of $X^1$, $X^2$, $L^1$, $L^2$, $L^3$, $R^1$, and $R^2$ can be attached to a support.

9. The method of claim 8, wherein:
   n and m are 0;
   $R^1$ is hydrogen, and $R^2$ is selected from $C_1$-$C_{20}$ alkyl, $C_2$-$C_{20}$ alkenyl, and $C_5$-$C_{20}$ aryl, optionally substituted with one or more moieties selected from $C_1$-$C_6$alkyl, $C_1$-$C_6$alkoxy, and phenyl;
   $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether; and
   $X^1$ and $X^2$ are independently selected from hydrogen, halide, $C_1$-$C_{20}$ alkyl, $C_5$-$C_{20}$aryl, $C_1$-$C_{20}$ alkoxy, $C_5$-$C_{20}$ aryloxy, $C_2$-$C_{20}$ alkoxycarbonyl, $C_6$-$C_{20}$ aryloxycarbonyl, $C_2$-$C_{20}$ acyl, $C_2$-$C_{20}$ acyloxy, $C_1$-$C_{20}$ alkylsulfonato, $C_5$-$C_{20}$ arylsulfonato, $C_1$-$C_{20}$ alkylsulfanyl, $C_5$-$C_{20}$ arylsulfanyl, $C_1$-$C_{20}$ alkylsulfinyl, or $C_5$-$C_{20}$ arylsulfinyl, any of which, with the exception of hydrogen and halide, are optionally further substituted with one or more groups selected from halide, $C_1$-$C_6$alkyl, $C_1$-$C_6$alkoxy, and phenyl.

10. The method of claim 8, wherein $L^1$ has the structure of formula (III)

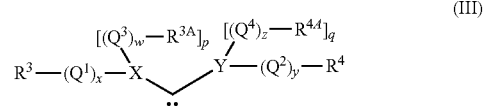

(III)

in which:
   X and Y are heteroatoms selected from N, O, S, and P;
   p is zero when X is O or S, and p is 1 when X is N or P;
   q is zero when Y is O or S, and q is 1 when Y is N or P;
   $Q^1$, $Q^2$, $Q^3$, and $Q^4$ are independently selected from hydrocarbylene, substituted hydrocarbylene, heteroatom-containing hydrocarbylene, substituted heteroatom-containing hydrocarbylene, and —(CO)—, and further wherein two or more substituents on adjacent atoms within Q may be linked to form an additional cyclic group;

w, x, y, and z are independently zero or 1; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl, such that the transition metal complex is a ruthenium carbene complex having the structure of formula (IV)

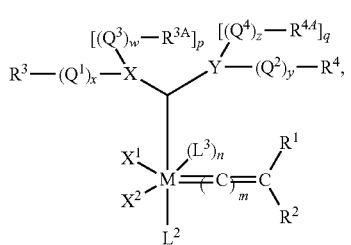

(IV)

wherein any two or more of $X^1$, $X^2$, $L^2$, $L^3$, $R^1$, $R^2$, $R^3$, $R^{3A}$, $R^4$, and $R^{4A}$ can be taken together to form a cyclic group, and further wherein any one or more of $X^1$, $X^2$, $L^2$, $L^3$, $R^1$, $R^2$, $R^3$, $R^{3A}$, $R^4$ and $R^{4A}$ may be attached to a support.

11. The method of claim 10, wherein m, w, x, y, and z are zero, X and Y are N, and $R^{3A}$ and $R^{4A}$ are linked to form -Q-, such that the ruthenium carbene complex has the structure of formula (VI)

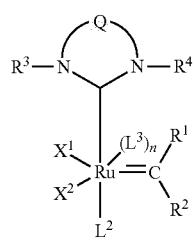

(VI)

wherein Q is a hydrocarbylene, substituted hydrocarbylene, heteroatom-containing hydrocarbylene, or substituted heteroatom-containing hydrocarbylene linker, and further wherein two or more substituents on adjacent atoms within Q may be linked to form an additional cyclic group.

12. The method of claim 11, wherein Q has the structure —$CR^{11}R^{12}$—$CR^{13}R^{14}$— or —$CR^{11}$=$CR^{13}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups, and or wherein any two of $R^{11}$, $R^{12}$, $R^{13}$, and $R^{14}$ may be linked together to form a substituted or unsubstituted, saturated or unsaturated ring.

13. The method of claim 12, wherein:

$R^1$ is hydrogen, and $R^2$ is selected from $C_1$-$C_{20}$ alkyl, $C_2$-$C_{20}$ alkenyl, and aryl, optionally substituted with one or more moieties selected from $C_1$-$C_6$alkyl, $C_1$-$C_6$alkoxy, and phenyl;

$L^2$ is selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether;

$X^1$ and $X^2$ are independently selected from hydrogen, halide, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_6$-$C_{20}$ aryloxycarbonyl, $C_2$-$C_{20}$ acyl, acyloxy, alkylsulfonato, $C_5$-$C_{20}$ arylsulfonato, $C_1$-$C_{20}$ alkylsulfanyl, $C_5$-$C_{20}$ arylsulfanyl, $C_1$-$C_{20}$ alkylsulfinyl, or $C_5$-$C_{20}$ arylsulfinyl, any of which, with the exception of hydrogen and halide, are optionally further substituted with one or more groups selected from halide, $C_1$-$C_6$ alkyl, $C_1$-$C_6$ alkoxy, and phenyl;

$R^3$ and $R^4$ are aromatic, substituted aromatic, heteroaromatic, substituted heteroaromatic, alicyclic, substituted alicyclic, heteroatom-containing alicyclic, or substituted heteroatom-containing alicyclic, composed of from one to about five rings; and $R^{12}$ and $R^{14}$ are hydrogen, $R^{11}$ and $R^{13}$ are selected from hydrogen, lower alkyl and phenyl, or are linked to form a cyclic group.

14. The method of claim 1, wherein the catalyst is a Grubbs-Hoveyda complex.

15. The method of claim 1, wherein the catalyst is a complex having an N-heterocyclic carbene ligand associated with a ruthenium center.

16. A ring-opening methathesis reaction product prepared by the method of claim 1.

17. The product of claim 16, wherein the product comprises a telechelic polymer, or a mixture of telechelic polymers.

* * * * *